(12) United States Patent
Theogaraj

(10) Patent No.: US 10,291,525 B2
(45) Date of Patent: May 14, 2019

(54) CACHING AND FORWARDING ROUTER ADVERTISEMENTS

(71) Applicant: Aruba Networks, Inc., Sunnyvale, CA (US)

(72) Inventor: Isaac Theogaraj, Bangalore South Taluk (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 39 days.

(21) Appl. No.: 14/790,187

(22) Filed: Jul. 2, 2015

(65) Prior Publication Data

US 2017/0005928 A1  Jan. 5, 2017

(51) Int. Cl.
*H04L 12/747* (2013.01)
*H04L 12/775* (2013.01)
*H04L 12/46* (2006.01)
*H04L 12/751* (2013.01)

(52) U.S. Cl.
CPC ........ *H04L 45/742* (2013.01); *H04L 12/4641* (2013.01); *H04L 45/02* (2013.01)

(58) Field of Classification Search
None
See application file for complete search history.

(56) References Cited

U.S. PATENT DOCUMENTS 6,052,718 A * 4/2000 Gifford ............. H04L 29/12009
709/219
8,341,717 B1  12/2012 Delker et al.
2005/0025125 A1  2/2005 Kwan
2006/0126661 A1 * 6/2006 Zheng et al. ... H04W 29/12066
370/469
2009/0067436 A1  3/2009 Gast et al.
2011/0103284 A1 * 5/2011 Gundavelli ............. H04L 12/18
370/312

(Continued)

OTHER PUBLICATIONS

Theogaraj, I.; "Final Office Action" cited in U.S. Appl. No. 14/790,326 dated Jun. 6, 2017; 42 pages.

(Continued)

*Primary Examiner* — George C Atkins
(74) *Attorney, Agent, or Firm* — Hewlett Packard Enterprise Patent Department

(57) ABSTRACT

Provided are devices, computer-program products, and methods (e.g. methods implemented on a network device) for caching and forwarding router advertisements. In some implementations, a router advertisement may be received by a network device. In these implementations, a router advertisement may include router service information. The router service information may correspond to a service associated with a router on a network. In some implementations, the router advertisement is stored. In some implementations, a router solicitation is also received. In these implementations, the router solicitation is associated with a client device on the network. In some implementations, the stored router advertisement is transmitted. In these implementations, the stored router advertisement is sent as a unicast packet. The stored router advertisement may facilitate a connection to the network when the stored router advertisement is received at the client device that was associated with the router solicitation.

34 Claims, 20 Drawing Sheets

(56) References Cited

U.S. PATENT DOCUMENTS

| | | | |
|---|---|---|---|
| 2011/0314119 A1* | 12/2011 | Kakadia | H04L 29/12066 |
| | | | 709/213 |
| 2013/0028133 A1 | 1/2013 | Narasimhan | |
| 2013/0294404 A1* | 11/2013 | Hong | H04W 36/005 |
| | | | 370/331 |
| 2015/0085734 A1 | 3/2015 | Nagaraja et al. | |
| 2015/0117215 A1* | 4/2015 | Nagaraja | H04L 47/10 |
| | | | 370/236 |

OTHER PUBLICATIONS

Theogaraj, I., et al.; "Non-Final Office Action cited in U.S. Appl. No. 14/790,326"; dated Feb. 23, 2017; 40 pages.

* cited by examiner

CACHING AND FORWARDING ROUTER ADVERTISEMENTS

SUMMARY

Routers are typically located at gateway points on a network, for example at a node that serves as a point of access to another network. Routers may transmit periodic, or unsolicited, router advertisements to notify any listening devices in a network that the router is available. Client devices may transmit router solicitations to learn about available routers. Routers may respond to router solicitations with solicited router advertisements. When many client devices join a network within a short span of time, many solicited router advertisements may be generated. These multiple solicited router advertisements may be received by client devices that did not request and do not need the information provided by the router advertisements. Router advertisements may, in many cases, be broadcast. When an access point is configured to support more than one Virtual Local Area Network (VLAN), a broadcast router advertisement may be sent to client devices that are not members of the VLAN to which the router advertisement was directed.

Provided are devices, computer-program products, and methods (e.g. methods implemented on a network device) for caching and forwarding router advertisements. In some implementations, a router advertisement may be received by a network device. In these implementations, a router advertisement may include router service information. The router service information may correspond to a service associated with a router on a network. In some implementations, the router advertisement is stored. In some implementations, a router solicitation is also received. In these implementations, the router solicitation is associated with a client device on the network. In some implementations, the stored router advertisement is transmitted. In these implementations, the stored router advertisement is sent as a unicast packet. The stored router advertisement may facilitate a connection to the network when the stored router advertisement is received at the client device that was associated with the router solicitation.

In some implementations, the stored router advertisement is one of two or more stored router advertisements, In these implementations, the two or more router advertisements each correspond to a different router on the network. In some implementations, at least one of these two or more stored router advertisements are selected for transmitting.

In some implementations, the router advertisement received by the network device is a periodic router advertisement. In some implementations, the router advertisement is a solicited router advertisement.

In some implementations, the router solicitation that is associated with a client device on the network is forwarded. In these implementations, forwarding may include transmitting the router solicitation on one or more outgoing ports. Furthermore, forwarding may include receiving an additional router advertisement, and storing the additional router advertisement.

In some implementations, the router advertisements received by the network device is the most recent router advertisement associated with the router. In some implementations, the most recent router advertisement is a periodic router advertisement. In other implementations, the most recent router advertisement is a solicited router advertisement.

In some implementations, transmitting the stored router advertisement further comprises transmitting the stored router advertisement to an access point. In these implementations, the access point is anchored at the network device. In some implementations, the client device associated with the router solicitation is also anchored at the network device.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by embodiments and optional features, modification and variation of the concepts herein disclosed may be resorted to by those skilled in the art, and that such modifications and variations are considered to be within the scope of the systems and methods as defined by the appended claims.

BRIEF DESCRIPTION OF THE DRAWINGS

Illustrative embodiments are described in detail below with reference to the following figures.

DETAILED DESCRIPTION

Figure 1:
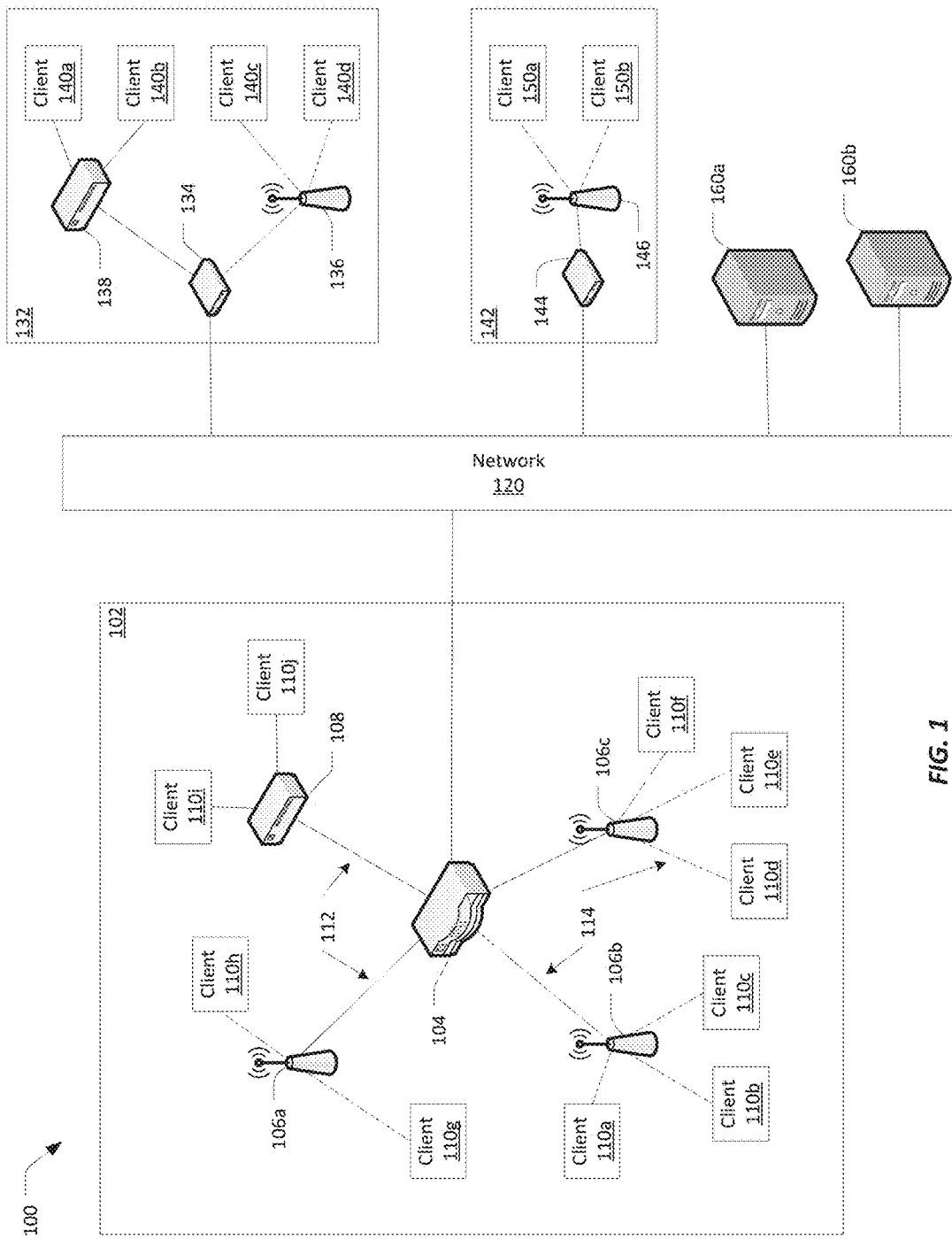
FIG. 1 illustrates one embodiment of a network configuration that may be implemented for a multi-user organization, such as a business, educational institution, governmental entity, or any other organization having multiple users and possibly multiple sites.

Communication and other networks can be organized into sub-networks, or subnets. Subnets typically comprise a logical grouping of a portion of the devices that make up the network. For example, an enterprise with offices in several locations might maintain a single private network organized into subnets, with each subnet being made up of the network devices located in a single office. Subnets in Internet Protocol (IP) networks and other networks may communicate with other subnets and other networks through routers. Routers are typically located at gateway points on a network, for example at a node that serves as a point of access to another network or to another subnet. Before client devices within a subnet can send packets outside of the subnet, the client devices need to learn about any available routers connected to the subnet. Router advertisements and router solicitations provide a mechanism for devices within a subnet to learn about local routers.

Routers may transmit router advertisements periodically. Periodic router advertisements inform any listening devices in a network that the router is available. These router advertisements may also notify listening devices of any changes in the Internet Protocol (IP) addresses used by the router. In some implementations, these router advertisements are transmitted as multicast packets, so that they may reach all client devices in a network. In other implementations, these router advertisements may be transmitted as unicast packets. Periodic router advertisements may also be called unsolicited router advertisements.

Client devices may transmit router solicitations to learn about available routers. Network devices may forward a router solicitation until the router solicitation reaches one or more routers. The routers may each respond with a solicited router advertisement. In some implementations, solicited router advertisements are also transmitted as multicast packets, so that they reach all client devices in a network, including the client device that transmitted the router solicitation.

When many client devices join a network within a short amount of time, a large amount of unnecessary network traffic may be generated by router solicitations and solicited router advertisements. Each client devices may transmit a router solicitation. Each router connected to the network may respond with a solicited router advertisement. The solicited router advertisement may be broadcast to all listening devices in the network, regardless of whether a specific device has any use for the router advertisement. When many client devices join a network in a short amount of time, router advertisements may cause a flood of unnecessary traffic.

Caching and forwarding of router advertisements provides a mechanism to potentially reduce the amount of traffic produced when a client device joins a network. In some implementations, a controller within a network may cache the most recent router advertisement received from each router connected to the network. The controller may then respond to a router solicitation with the cached router advertisement rather than sending the router solicitation on. When a network configuration includes multiple controllers, the controller's responses to router solicitations may be coordinated.

Router advertisements do not include knowledge of virtual local area networks (VLANs). In some network configurations, access points may be configured to support more than one VLAN. In many cases, a router advertisement may be intended for client devices in only one VLAN. In most implementations, however, router advertisements are multicast. Multicasting a router advertisement to an access point that includes more than one VLAN may result in the router advertisement reaching client devices in multiple VLANs. This may cause client devices in the other VLANs to be misconfigured or to direct traffic to an incorrect router.

In some implementations, controllers may manage the forwarding of router advertisements to avoid a router advertisement reaching client devices in more than one VLAN. For example, controllers may recognize when an access point is configured with more than one VLAN. In such a case, the controllers may cause the access point to unicast the router advertisement to each client device that is a member of the target VLAN. As another example, the controllers may recognize when an access point is configured with only one VLAN. In this case, the controllers may cause the access point to multicast the router advertisement to all the client devices associated with the access point. In this case, there is little concern that the router advertisement will reach client devices in multiple VLANS, and multicasting the router advertisement is more efficient than unicasting to each client device.

In some implementations, controllers may also manage the forwarding of router advertisements when client devices join and leave a network. As noted above, when an access point is configured with only one VLAN, the access point may transmit multicast router advertisements. When a new client device associates with this access point, the derivation rules may assign the new client device to a different VLAN. As a result, the access point may now be configured with more than one VLAN. Controllers in the network may recognize this change, and switch from causing this access point to multicast router advertisements to causing the access point to unicast the router advertisement to each individual client device that is a member of the target VLAN. Client devices may later disassociate from the access point, and cause the access point once again to be configured with only one VLAN. Controllers in the network may then switch the access point back to multicasting router advertisements.

I. Network Configurations

FIG. 1 illustrates one embodiment of a network configuration 100 that may be implemented for a multi-user organization, such as a business, educational institution, governmental entity, or any other organization having multiple users and possibly multiple physical or geographical sites. The network configuration 100 may include a main office 102 in communication with a network 120. The network configuration 100 may also include one or more remote sites 132, 142, also in communication with the network 120.

The main office 102 may include a primary network, possibly also called a corporate network or a home network. The main office 102 network may be a private network. A private network is a network that may include security and access controls, such that only certain users are authorized to access the private network. Authorized users may include, for example, employees of a company based in the main office 102.

In the illustrated example, the main office 102 includes a controller 104 in communication with the network 120. The controller 104 may provide communication with the network 120 for the main office 102, though it may not be the only point of communication with the network 120 for the main office 102. A single controller 104 is illustrated, though the main office may include multiple controllers and/or multiple communication points with network 120. In some embodiments, the controller 104 communicates with the network 120 through a router (not illustrated). In other embodiments, the controller 104 provides router functionality to the devices in the main office 102.

A controller 104 may be operable to configure and manage network devices, such as in the main office 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless access points 106a-c. Switches 108 and wireless access points 106a-c provide network connectivity to various client devices 110a-j. Using a connection to a switch 108 or access point 106a-c, a client device 110a-j is able to access network resources, including other devices on the network and the network 120.

Examples of client devices include, but are not limited to: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, netbook computers, televisions and similar monitors, content receivers, set-top boxes, personal digital assistants (PDAs), mobile phones, smart phones, smart terminals, dumb terminals, virtual terminals, video game consoles, and the like.

Within the main office 102, a switch 108 is included as one example of a point of access to the network for wired client devices 110i-j. Client devices 110i-j may connect to the switch 108 and through the switch 108 may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless access points 106a-c are included as another example of a point of access to the network for client devices 110a-h. An access point 106a-c is a combination of hardware, software, and/or firmware that is configured to provide wireless network connectivity to wireless client devices 110a-h. In the illustrated embodiment, the access points 106a-c can be managed and configured by the controller 104. The access points 106a-c communicate with the controller 104 and the network over either wired 112 or wireless 114 connections.

The network configuration 100 may include one or more remote sites 132. A remote site 132 may be located in a different physical or geographical location from the main office 102. In some cases, the remote site 132 may be in the same geographical location, or possibly the same building, as the main office 102, but lacks a direct connection to the network located within the main office 102, relying instead on a connection over a different network 120. A remote site 132 such as the one illustrated may be, for example, a satellite office. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or access point 136 in communication with the gateway device 134 over either wired or wireless connections. The switch 138 and access point 136 provide connectivity to the network for various client devices 140a-d.

In various embodiments, the remote site 132 is in direct communication with main office 102, such that client devices 140a-d at the remote site 132 access the network resources at the main office 102 as if these client devices 140a-d were located at the main office 102. In such embodiments, the remote site 132 is managed by the controller 104 at the main office, and the controller 104 provides the necessary connectivity, security, and accessibility that enable the remote site's 132 communication with the main office 102. Once connected to the main office 102, the remote site 132 may function as a part of a private network provided by the main office 102.

In various embodiments, the network configuration 100 may include one or more smaller remote sites 142, comprising only a gateway device 144 for communicating with the network 120 and a wireless access point 146, by which various client devices 150a-b access the network 120. Such a remote site 142 may represent, for example, an individual employee's home or a temporary remote office. The remote site 142 may also be in communication with the main office 102, such that the client devices 150a-b at remote site 142 access network resources at the main office 102 as if these client devices 150a-b were located at the main office 102. The remote site 142 may be managed by the controller 104 at the main office 102 to make this transparency possible. Once connected to the main office 102, the remote site 142 may function as a part of a private network provided by the main office 102.

The network 120 may be a public network, such as the Internet. A public network is a network that may be shared by any number of entities, including the illustrated network configuration 100. A public network may have unrestricted access, such that any user may connect to it. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, that are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a-j, 140a-d, 150a-b may request and access the multimedia content provided by the content servers 160a-b.

Figure 2:
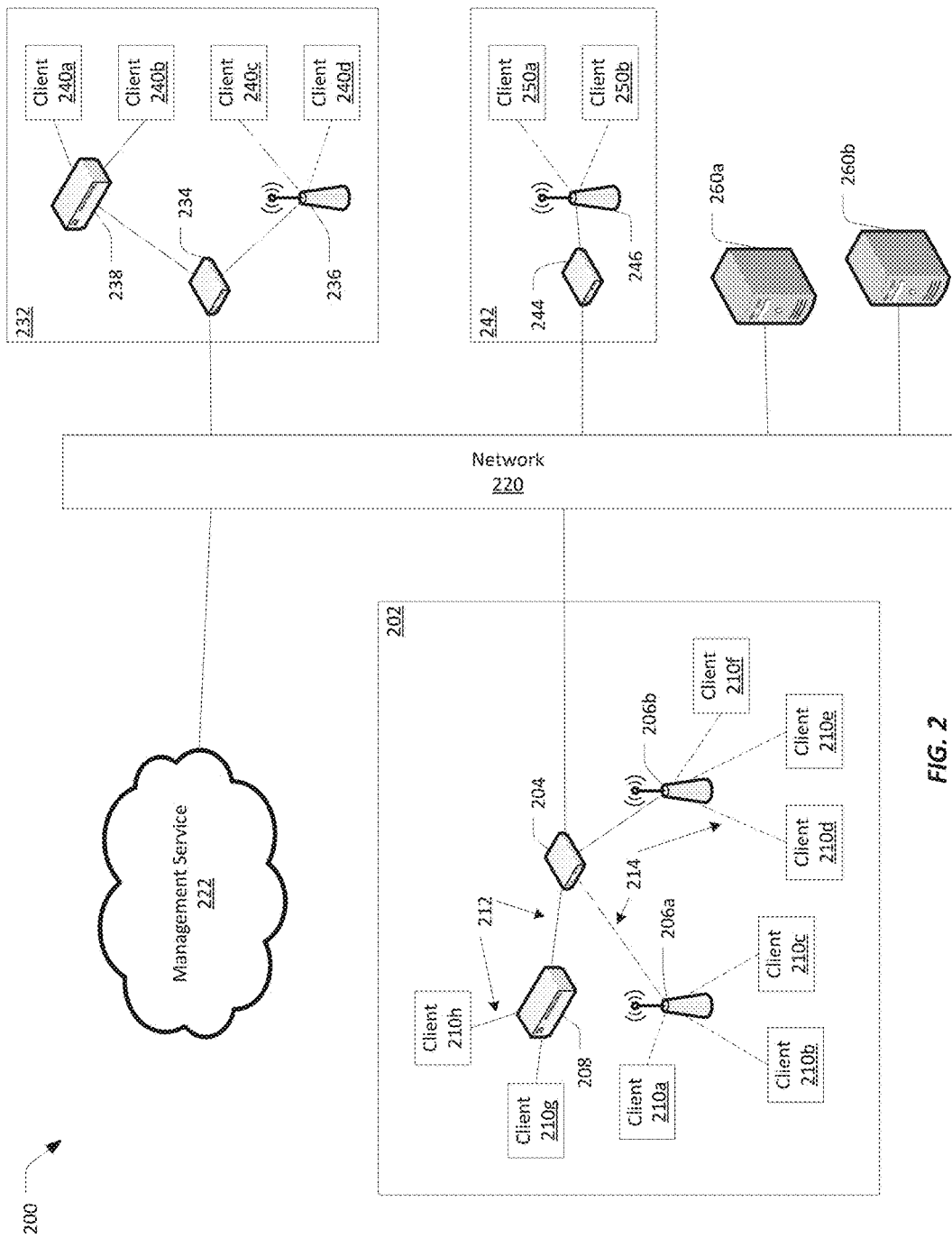
FIG. 2 illustrates an embodiment of a network configuration that includes a cloud-based management service.

FIG. 2 illustrates an embodiment of a network configuration 200 that includes a cloud-based management service 222. The network configuration 200 may be implemented for a multi-user organization. The network configuration 200 includes a main office 202 in communication with a network 220, and may also include one or more remote sites 232, 242, also in communication with the network 220. In the illustrated embodiment, the main office 202 includes a gateway device 204, such as a router, for communicating with the network 220. A single gateway device 204 is illustrated, though the main office 202 may include multiple gateway devices and/or multiple communication points with the network 220.

The gateway device 204 may be in communication with one or more switches 208 and/or wireless access points 206a-b. Switches 208 and access points 206a-b provide network connectivity to various client devices 210a-h. Using a connection to a switch 208 or access point 206a-b, a client device 210a-h is able to access network resources, including other devices on the network and the network 220.

A switch 208 is included as an example of a point of access to the network for client devices 210g-h. Client devices 210g-h may communicate with the switch 208 over a wired 212 connection. Wireless access points 206a-b are included as another example of a point of access to the network for client devices 210a-f. Client devices 210a-f may communicate with the access points 206a-b over wireless 214 connections. The access points 206a-b may themselves communicate with the gateway device 204 over either wired 212 or wireless 214 connections.

In some embodiments, the network configuration 200 may include a cloud-based management service 222. The management service 222 may include various software and software processes for configuring and/or managing network devices at the main office 202. Management tasks may include, for example, access, authentication, security, hardware management, and/or internal and/or external communication. The management service 222 may be running on a server local to the main office 202, or a server located remotely from the main office 202, or may be distributed across any number of local and/or remote servers. In embodiments where the management service 222 is located remote to the main office 202, the management service 222 may access the main office 202 over the network 220.

The network configuration 200 may include one or more remote sites 232, 242. A remote site 232 may include a gateway device 234 for communicating with the network 220. The remote site 232 may also include a switch 238 and/or access point 236 in communication with the gateway device 234 over either wired or wireless connections. The switch 238 and access point 236 provide connectivity to the network 220 for various client devices 240a-d.

In various embodiments, the remote site 232 may be configured and/or managed by the management service 222, such that client devices 240a-d at the remote site 232 access the network resources at the main office 202 as if these client devices 240a-d were located at the main office 202. The management service 222 provides the necessary connectivity, security, and accessibility that enable the remote site's 232 communication with the main office 202.

In various embodiments, the network configuration 200 may also include one or more smaller remote sites 242, comprising only a gateway device 244 for communicating with the network 220 and a wireless access point 246, by which various client devices 250a-b access the network 220. The remote site 242 may also be configured and/or managed by the management service 222, such that the client devices 250a-b at the remote site 242 access network resources at the main office 202 as if these client devices 250a-b were located at the main office 202. The management service's 222 control over the remote site 242 makes this transparency possible.

The network 120 may be a public network, such as the Internet. The network 120 may include various content servers 260a-b. The client devices 210a-h, 240a-d, 250a-b may request and access data and content provided by the content servers 260a-b over their connection to the network 120.

Figure 3:
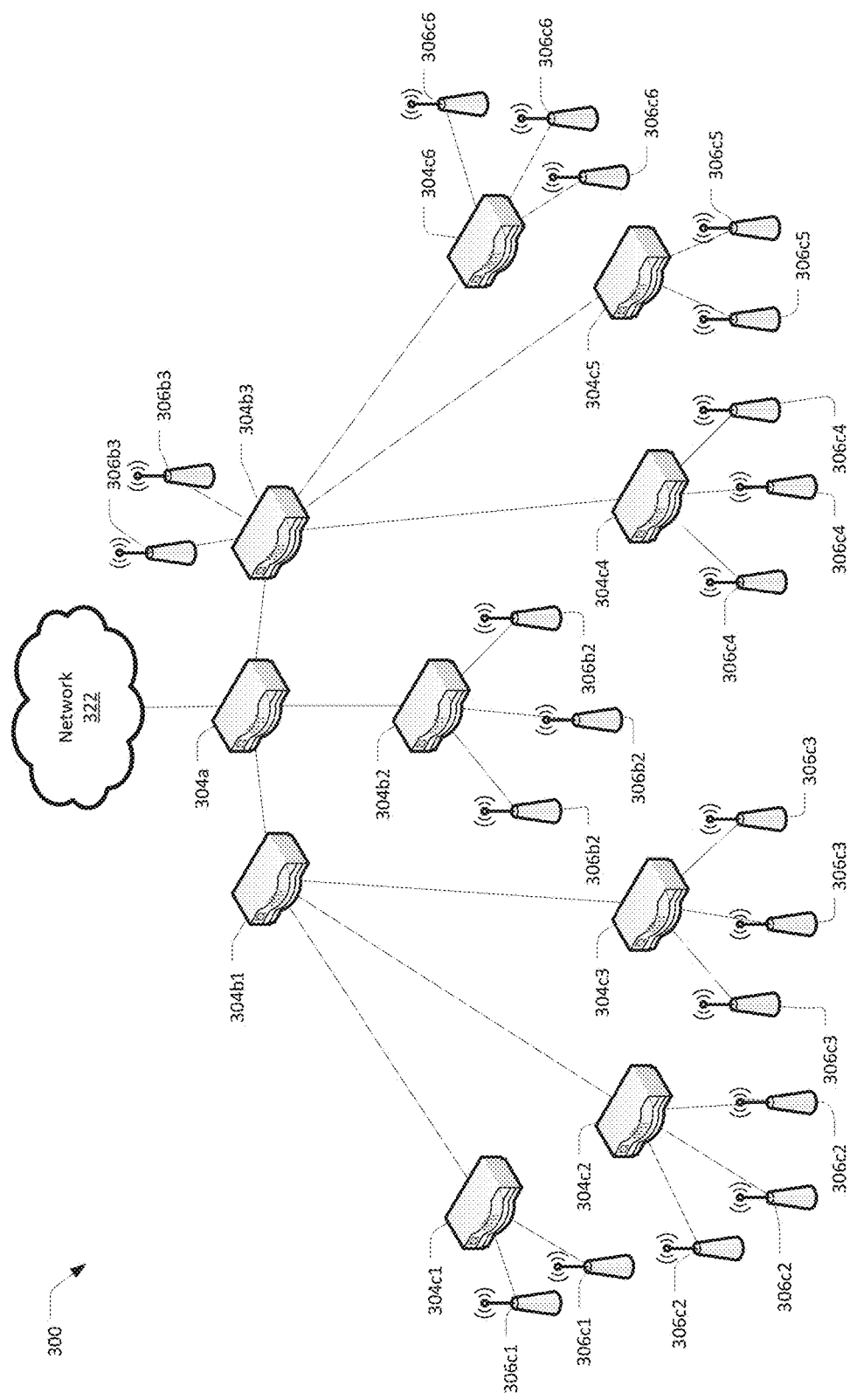
FIG. 3 illustrates an example of a controller cluster configuration.

FIG. 3 illustrates another embodiment of a network configuration. Specifically, illustrated in FIG. 3 is an example of a controller cluster configuration 300. A controller cluster configuration 300 includes a number of controllers 304a, 304b1-3, 304c1-6 in communication with one another. The various controllers 304b1-3, 304c1-6 may be located in the same geographic location, such as for example in a main office. Alternatively or additionally, some of the controllers may be located at remote sites, and communicate with the other controllers over a combination of networks that may include the Internet.

One controller 304a may be configured to be primary controller 304a. The primary controller 304a may also be called the cluster root controller, the master controller, or the user anchor controller (UAC). The primary controller 304a may be responsible for configuring and/or managing all or most of the controller cluster 300. In some embodiments, the primary controller 304a may be connected to a router, switch, and/or gateway (not illustrated), to connect to a network 322 outside of the cluster 300.

The controller cluster 300 may include a number of secondary controllers 304b1-3. The secondary controllers 304b1-3 each communicate with the primary controller 304a. The secondary controllers 304b1-3 may be "downstream" from the primary controller 304a; that is, the secondary controllers 304b1-3 may be closer to any client devices that are part of the cluster configuration 300 (the "downstream" direction), and further away from the connection to the network 322 (the "upstream" direction). In some embodiments, one or more of the secondary controllers 304b2-3 may be connected to one or more access points 306b2-3. For example, the controller 304b2 may be connected to three access points 306b2. A controller—including any controller "upstream" or "downstream" from a secondary controller 304b2-3—that is connected to one or more access points may be referred to as an access point anchor controller (AAP). The secondary controllers 304b2-3 may provide configuration and/or management services for any access points 306b2-3 that are connected to them The secondary controllers 304b2-3 may further provide configuration and/or management serves for any client devices (not shown) associated with such access points 306b2-3. In some cases, a secondary controller 304b1-3 may also function as a UAC. This may be the case, for example, when the secondary controller 304b2-3 is connected to controllers further downstream. For example, the controller 340b3 is connected to several downstream controllers 304c4-6, and thus may, in some cases, function as a UAC.

In some embodiments, the controller cluster may also include a number of tertiary controllers 304c1-6. Each of the tertiary controllers 304c1-6 may be connected to one secondary controller 304b1-3 in the "upstream" direction. In some embodiments, a tertiary controller 304c1-6 may not be connected to any controllers in the "downstream" direction. Such a controller may be referred to as a local controller. For example, in the illustrated example, each of the tertiary controllers 304c1-6 are local controllers. Tertiary controllers 304c1-6 may be connected to any number of access points 306c1-6. The tertiary controllers 304c1-6 may provide configuration and/or management services for any of the access points 306c1-6 that are connected to them. The tertiary controllers 304c1-6 may also provide configuration and/or management services for any client devices (not shown) associated with an access point 306c1-6.

The example of FIG. 3 illustrates a controller cluster configuration 300 consisting of three (primary, secondary, and tertiary) levels to provide an example of a cluster configuration 300. A controller cluster configuration 300 may include more or fewer levels, as is desirable and/or practicable for a given situation.

Controllers at different levels of the cluster configuration 300 may provide similar or different services for the devices connected to them. For example, a controller may provide configuration and/or management services to only devices at the next downstream level. For example, the controller 304a may configure and manage only the controllers 304b1, 304b2, and 304b3. Further, the controller 304b1 may configure and manage only the controllers 304c1, 304c2, and 304c3. Alternatively or additionally, a controller may provide configuration and/or management services for all devices in the downstream direction. For example, the controller 304a may configure and manage the controllers 304b1, 340c1-3, and all associated access points 304c1-3. It may be more advantageous and practical, however, to distribute the configuration and management duties among the various controllers.

II. Router Advertisements and Router Solicitations

In some implementations, network configurations, such as those illustrated in FIGS. 1-3, are organized into sub-networks, or subnets. A subnet provides a single shared network address for the devices within the subnet. A subnet may include all of the network devices in a local area network (LAN) or a wide-area network (WAN) or those on several LANs and/or WANs. Subnets communicate between each other through and to other networks through routers. Router advertisements and router solicitations provide a mechanism for devices within a subnet to learn about routers that are connected to the subnet.

Figure 4A:
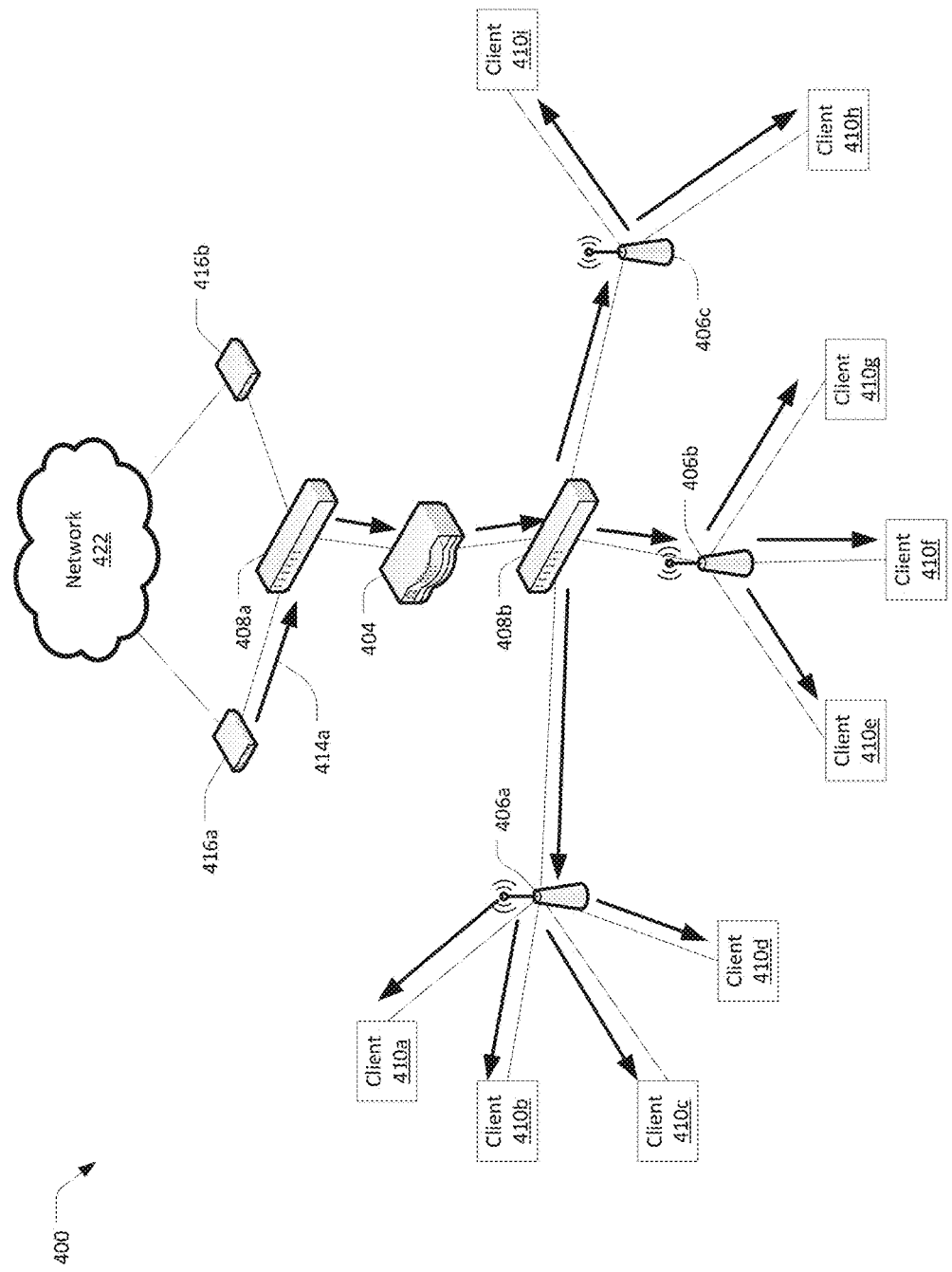
FIG. 4A illustrates an example of a router transmitting periodic router advertisements, also called "unsolicited" router advertisements, to the subnet.
Figure 4B:
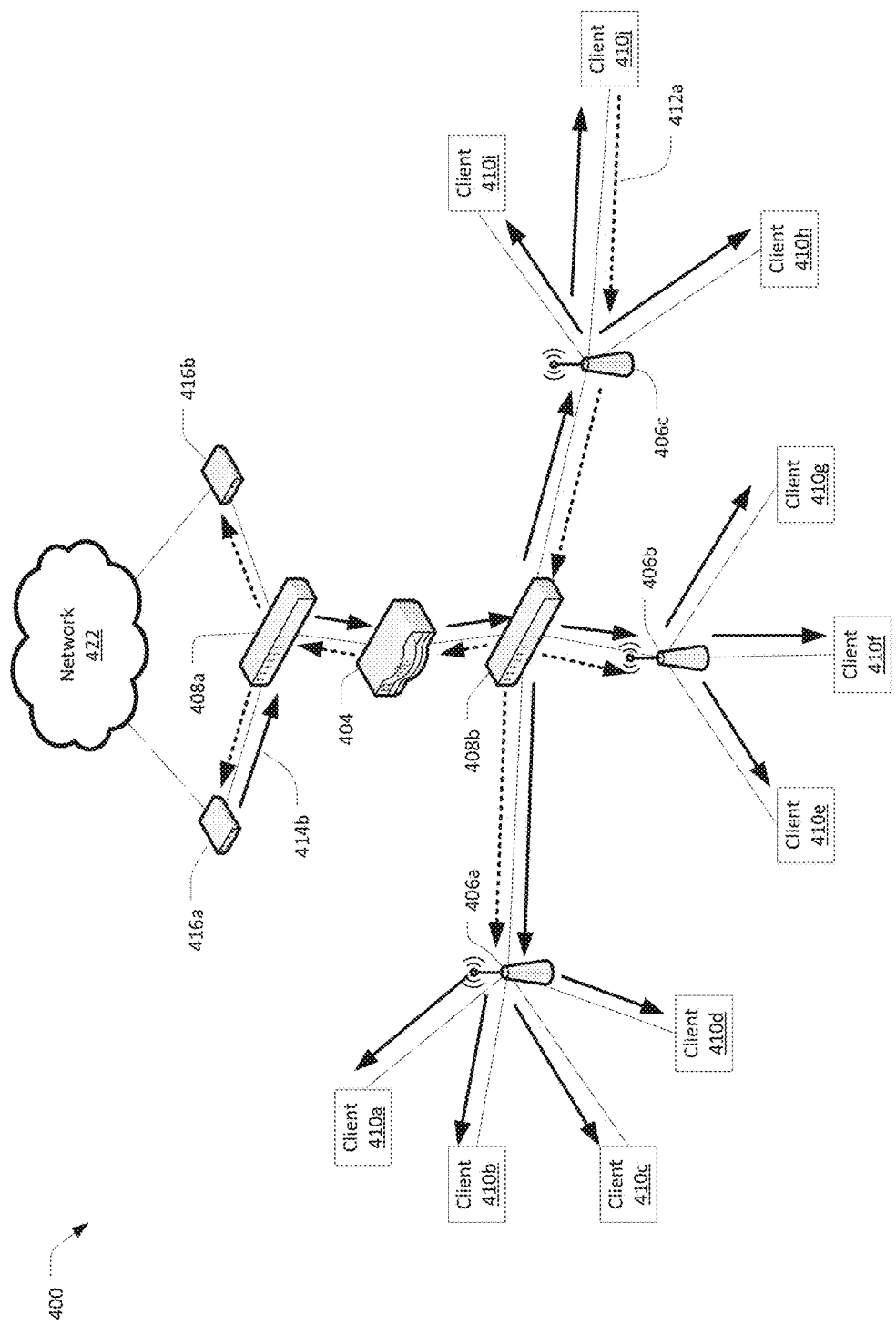
FIG. 4B illustrates a new client device joining the subnet and transmitting a router solicitation.

FIGS. 4A-4B illustrate one example of a subnet 400. In this example, the subnet 400 includes a controller 404, several switches 408a-b, several wireless access points 406a-c, and a number of client devices 410a-i. The subnet 400 communicates with networks 422 outside the subnet 400 through either of two routers 416a-b. The routers 416a-b are connected to the subnet 400 through a first switch 408a. The controller 404 is also connected to the first switch 408a, downstream from the routers 416a-b. The controller 404 is also connected to a second switch 408b. The access points 406a-c are also connected to the second switch 408b. Each of the client devices 410a-i is associated with an access point. The access points 406a-c provide wireless network services to the client devices 410a-i.

Routers, such as the illustrated routers 416a-b, may have one or more interfaces, where each interface provides a physical connection to the router. For example, a router may have one or more interfaces for copper cables, fiber optic cables, or antennas for wireless transmissions. For example, in the illustrated example, the routers 416a-b may be connected to the switch 408a using Category 5 (cat-5) cables. For each of the routers 416a-b, the cat-5 connection to the switch 408a constitutes one interface. Each router interface may have one or more Internet Protocol (IP) addresses. Devices in a subnet may use the IP address of the router's interface to which they are connected to communicate with networks outside of the subnet. Devices in a subnet may, in some cases, also use the router interface's IP address to identify themselves to outside networks. For the sake of brevity, router interface IP addresses may also be referred to simply as router addresses herein. Wireless access points may also function as routers. For purposes of the example of FIGS. 4A-4B, however, the access points 406a-c do not provide router functionality.

Subnets, such as the subnet 400, are identifiable, separate parts of a network configuration. A subnet, for example, may include all the network-connected devices in one geographic location, in one building, or on the same LAN. Subnets provide a way to limit the number of IP addresses that need to be distributed to devices on the network. Currently, IP addressing schemes do not provide enough IP addresses for all devices on all networks to each have a unique IP address. IP address allow the routing of IP packets across networks Subnets group together a number of logically related devices, and allow them to present a single IP address to other networks and devices. This allows routers to route packets intended for any device within the subnet to the same IP address (typically the IP address of an interface of a router assigned to that subnet) without needing to determine the exact address of the intended device. Once a packet reaches the subnet device to which the IP address has been assigned, the subnet device uses other address information to determine the address of the intended device. This is similar to a mail address in which the zip code (similar to an IP address) determines to which post office a letter should be sent and then that post office uses other address information (e.g. the street number and name) to determine the exact house to which to deliver the letter. In order properly to deliver a letter, within zip codes, each street address must be unique but across zip codes, street addresses can be the same (for example, there can be only one "123 Main Street" in zip code 95034 but the same street address may exist in both zip code 95034 and zip code 95060).

Subnets communicate with other networks through one or more routers. Routers are typically located at "gateway" points on a network, that is, a node on the network that serves as a point of access to other networks. Routers link networks together, and forward packets from one network to another. In most implementations, routers only have knowledge of the networks to which they are connected. Routers learn about networks beyond their view using routing protocols. Routing protocols provide a mechanism for routers to send information to each other. Using this information, routers build routing tables, that is, a description of the topology—or at least the local topology—of the network beyond the router's immediate neighbors. Routers use routing tables to determine a route for a packet to reach its destination, a procedure usually called "routing." A router may route a packet at least partway to its destination, and rely on one or more other routers to complete the packet's trip.

A switch, in contrast, has more limited functionality. A switch typically connects devices within a single LAN or WAN. In typical implementations, switches use the Media Access Control (MAC) addresses of the devices within the LAN/WAN to frames intended for a device or devices within that single LAN or WAN. They are able to forward frames directly from one port on the switch to another, without needing to do any routing.

Before devices within a subnet, such as the client devices 410a-i, can send packets outside of the subnet 400, the client devices 410a-i may need to discover the IP address of at least one operational router connected to the subnet 400. A device may use various methods to find the IP address of a local router. For example, the device may be able to read a configuration file that contains a list of IP addresses of locally available routers. Each device, however, would need a copy of this configuration file, or know where to find it. Moreover, the configuration file may need to be maintained manually (that is, by a human being), and so may not be able to track dynamic changes in router availability.

An alternate method for discovering router addresses is for a device to listen to routing protocol traffic. Routing protocols provide a way for routers to share information about each other. Devices listening to routing protocol traffic, however, must understand the particular routing protocols in use. Routing protocols may vary from one subnet to another, and may change at any time.

To overcome the disadvantages of these and other methods for discovering router addresses, various networking protocols provide discovery messages called router advertisements and router solicitations. Router advertisements and router solicitations avoid the need for manual configuration of a router list and are independent of any specific routing protocol.

A router may periodically transmit router advertisements from one or more of its interfaces, announcing the IP address or addresses of that interface. FIG. 4A illustrates an example of a router 416a transmitting periodic router advertisements 414a, also called "unsolicited" router advertisements, to the subnet 400. Router advertisements may be transmitted as multicast packets. Multicast packets are usually sent in a broadcast domain, that is, a domain that all devices in the subnet 400 are listening to. In most cases, all devices will accept and process packets received in a broadcast domain. For example, in the example of FIG. 4A, the router 416a multicasts a periodic router advertisement 414a to the switch 408a. The switch 408a forwards the periodic router advertisement 414a to the controller 404. The controller 404 forwards the periodic router advertisement 414a, as a multicast packet to the switch 408b. The switch 408b, in turn, forwards the periodic router advertisement 414a to all of its ports (other than the port from which the periodic router advertisement 414a was received). The access points 406a-c similarly forward the periodic router advertisement 414a to all associated client devices 410a-i. Multicasting periodic router advertisements 414a efficiently distributes the information in the router advertisement to all devices in the subnet 400; few packets are needed, and the periodic router advertisement reaches all the devices in the subnet 400. In the example of FIG. 4A, both routers 416a-b may periodically transmit router advertisements, though periodic router advertisements from the router 416b are not illustrated.

Devices in a subnet may use the periodic router advertisements to maintain and update a local list of available router IP addresses. In some cases, the devices may designate a router IP address as the device's default gateway address. The default gateway address is the address the device may use to transmit packets outside of the subnet. In some cases, devices may designate an alternate gateway address. For example, the client device 410a may designate the IP address of the router 416a as its default gateway address, and the IP address of the router 416b as the alternate gateway address. In some cases, the devices in a subnet may use information from the router advertisements to generate an IP address for themselves. For example, the router advertisement may include a subnet prefix. A subnet prefix may describe the address of the subnet itself. The devices in the subnet may prepend or postfix the subnet prefix to their own IP addresses, and use the combined address to identify themselves outside of the subnet. To continue the previous analogy, a subnet prefix may be "Santa Clara" and a device may use "123 Main Street, Santa Clara" as its external IP address. In other cases, the router advertisement may include the IP address of a DNS server. When a device in the subnet has the name of a destination device and needs the IP address that corresponds to that name, the device may use this DNS server to obtain the IP address.

Router advertisements often also include a "lifetime." The lifetime indicates a time period for which the router advertisement is valid. After the expiration of that time, a device should no longer rely on the addresses provided by the router advertisement. Routers transmit router advertisements periodically, with the period typically being shorter than the lifetime. Periodic router advertisements thus inform listening devices that the router is still alive and available. Should the IP address or addresses of the router's interface change, periodic router advertisements also inform listening devices of such changes.

When a new client device joins a network, the new client device may transmit a router solicitation to learn the IP addresses of available routers. FIG. 4B illustrates a new client device 410j joining the subnet 400 at the access point 406c. Once the client device 410j has associated with the access point 406c, the client device 410j may transmit a router solicitation 412a. A router solicitation is directed to any listening routers, and requests that those routers transmit a router advertisement. Router solicitations may be transmitted as multicast packets. The new client device 410j does not know if there are any routers connected to the subnet 400, and relies on the switches 408a-b and controllers 404 to forward its multicast router solicitation until the router solicitation reaches one or more routers. In most cases, the routers respond very quickly to router solicitations, so that, for example, the router 416a may transmit a solicited router advertisement 414b not long after receiving the router solicitation 412a. Though not illustrated, the router 416b may also transmit a solicited router advertisement in short order.

Solicited router advertisements provide a quicker way for client devices that have just joined a network to learn about available routers. Periodic, unsolicited router advertisements are often transmitted a multiple of minutes apart, and waiting for the next periodic router advertisement may be impractical for a client devices. Router solicitations and solicited router advertisements provide a way for client devices joining a network, such as the new client devices 410i, to relatively quickly learn about routers 416a-b available to the subnet 400. Solicited and periodic router advertisements may otherwise be indistinguishable.

Client devices may also transmit router solicitations when the lifetime of a router advertisement has expired. Expiration of the lifetime indicates that any IP addresses provided by the router advertisement may no longer be valid. For example, in FIG. 4B the client device 410j may have selected the router 416b as its default gateway. The lifetime of the last router advertisement that the client device 410j received from the router 416b may have just expired. The client device 410j now no longer has a functioning gateway. The client device 410j may send one or more router solicitations 412a to determine whether the router 416b is still available. Assuming that the router 416b has gone offline, the client device 410j will not receive any router advertisements from the router 416b in response to its router solicitations. The client device 410j may then assume that the router 416b is no longer available. The router 416a, however, may respond to router solicitations 412a from the client device 410j. Seeing that this router 416a is available, the client device 410j may begin using the router 416a as its default gateway.

As can been seen in FIG. 4B, a large amount of network traffic can be created by router advertisements triggered in response to router solicitations. This is especially true when many client devices join the subnet 400 in a short span of time. Each client device may transmit a router solicitation, and each router solicitation will be broadcast to the entire subnet 400. Each router solicitation may trigger router advertisements from both routers 416a-b. Each of these router advertisements may be multicast across the subnet 400, possibly only microseconds apart. In this situation, the controller 404, access points 406a-c, and client devices 410a-j may be flooded with unnecessary traffic in the form of unwanted router advertisements. Networks may thus benefit from a mechanism that reduces the amount of traffic generated when client devices join the network.

III. Caching and Forwarding Router Advertisements

In various implementations, caching and forwarding of router advertisements provides a mechanism to reduce the amount of network traffic generated when a client device joins a network. This mechanism involves caching router advertisements sent by router interfaces, and forwarding cached router advertisements in response to a router solicitation. Network controller devices may be used to cache and forward router advertisements. In some implementations, controllers may have the information to transmit unicast router advertisements in place of multicast router advertisements, for example, to reduce network traffic to devices that have not requested router information. In network configurations that include multiple controllers, the controllers may coordinate to determine which controller may forward a cached router advertisement. Alternatively or additionally, the controllers may decide independently whether to forward a cached router advertisement. Devices in a network other than controllers may implement caching and forwarding provided that they able to unicast packets to client devices.

Figure 5A:
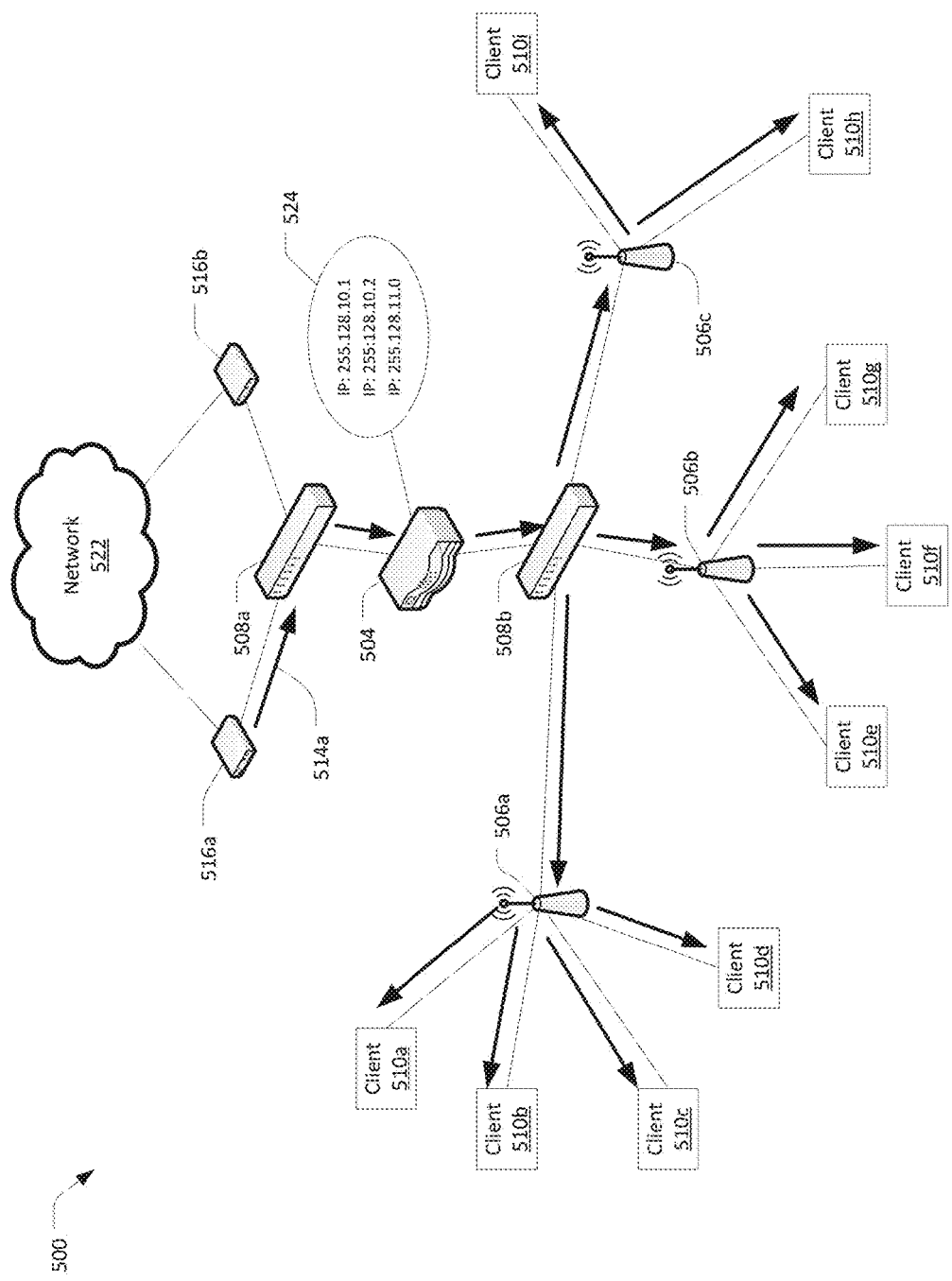
FIG. 5A illustrates an example of caching router advertisements.
Figure 5B:
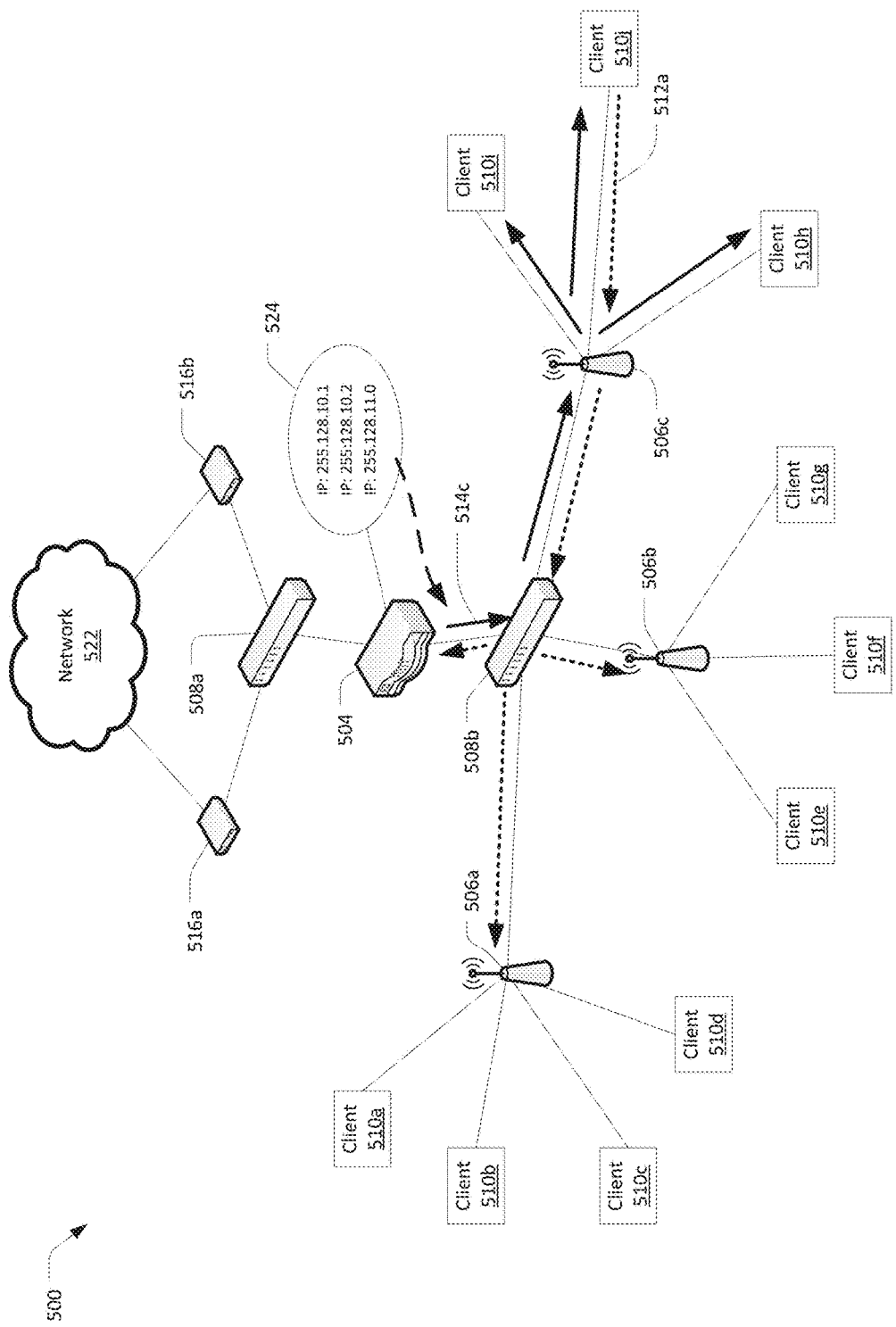
FIG. 5B illustrates an example of a new client device joining the subnet and receiving a cached router advertisement.

FIGS. 5A-5B illustrate one example of a subnet 500 that includes one controller 504. The subnet 500 also includes several switches 508a-b, several wireless access points 506a-c, and a number of client devices 510a-i. The subnet 500 communicates with networks 522 outside the subnet through either of two routers 516a-b. The routers 516a-b are connected to the subnet 500 through a first switch 508a. The controller 504 is also connected to the first switch 508a, downstream from the routers 516a-b. The controller 504 is also connected to a second switch 508b. The access points 506a-c are also connected to the second switch 508b, downstream from the controller 504. Each client device 510a-i is associated with an access point 506a-c. The access points 506a-c provide wireless network services to the client devices 510a-i.

In the example illustrated in FIG. 5A, the router 516a has transmitted a periodic router advertisement 514a. The periodic router advertisement 514a is multicast to the devices in the subnet 500, and informs these devices of the IP addresses at the router's 516a's interface. The periodic router advertisement 514a is also transmitted periodically, to inform the devices in the subnet 500 that the router 516a is still available. The periodic router advertisement 514a may also notify devices in the subnet 500 when the router's 516a IP addresses have changed.

FIG. 5A also illustrates caching of router advertisements. In the example of FIG. 5A, the controller 504 has cached— that is, stored a copy 524—of the periodic router advertisement 514a. Though not illustrated, the controller 504 will cache router advertisements from the second router 516b also. The most recent router advertisement for either router 516a-b typically contains the most up-to-date information, and so the controller 504 may opt to store only the most recent router advertisement. In some cases, the controller 504 may store several router advertisements from each router 516a-b. The most recent router advertisement may be either a periodic, unsolicited router advertisement 514a or a solicited router advertisement, transmitted in response to a router solicitation.

Caching periodic router advertisements 514a allows the controller 504 to respond to router solicitations from new client devices without the need to communicate again with the router. FIG. 5B illustrates an example of a new client device 510j joining the subnet 500. The new client device 510j has associated with the access point 506c. Once the client device 510j has associated with the access point 506c, the client device 510j may transmit a router solicitation 512a to learn about locally available routers. Without caching and forwarding, the controller 504 would receive the router solicitation 512a and forward it, so that it may reach the routers 516a-b. The controller 504 would then receive a router advertisement back from at least one of the routers 516a-b and forward this router advertisement on to the new client device 510j. With caching and forwarding, the controller 504 may be configured not to forward the router solicitation 512a. Instead, the controller 504 may itself respond to the router solicitation 512a with the cached router advertisement 524. Furthermore, the controller 504 may transmit the cached router advertisement 524 as a unicast packet 514c, addressed to the new client device 510j. The controller 504 may forward a cached router advertisement from each of the routers 516a-b. Alternatively, the controller 504 may select only one cached router advertisement to forward. The selection may be based on, for example, controlling which router 516a-b the new client device 510j should use as its default gateway. As another example, the criterion may be selection of which router's 516a-b subnet prefix the client device 510j should use.

Having the controller 504 respond to a router solicitation 512a with a cached router advertisement 524 transmitted as a unicast packet may have several advantages. First, the router solicitation 512a is not forwarded past the controller 504. This may reduce the amount of traffic produced by multicasting the router solicitation 512a in all directions. Second, the routers 516a-b do not receive the router solicitation 512a. The routers 516a-b thus do not transmit solicited router advertisements in response to the router solicitation 512a. As a result, no solicited router advertisements are broadcast to all parts of the subnet 500, possibly reducing the amount of network traffic that would otherwise be generated. Third, the controller 504 transmits the cached router advertisement 524 as a unicast packet 514c, rather than as a multicast packet. The client devices 510h-i that share the access point 506c with the new client device 510j thus will not receive the router advertisement. In most cases, these client devices 510h-i do not need the solicited router advertisement because their routing information was updated by the most recent periodic router advertisement. Fourth, the controller may forward the router advertisements in an intelligent manner, such as using the selection criteria above or other selection criterion such as network load balancing or network security needs to determine which router advertisement to forward to the new client device.

In some cases, upon receipt of a router solicitation, the controller 504 may determine that it should not respond with a cached router advertisement 524. For example, the controller 504 may determine that the cached router advertisement's 524 lifetime has expired. As another example, the controller 504 may be aware that the network configuration has changed, and that it needs to refresh its cached router advertisements. Yet another example is that the controller 504 may determine that some information from the router solicitation should be forwarded to the routers 516a-b. In any of these situations, or ones not described, the controller 504 may allow the router solicitation 512a to be multicast from its ports and reach the routers 516a-b. The controller 504 may not respond with the cached router advertisement 524, instead expecting solicited router advertisements to eventually arrive from the routers 516a-b. The controller 504 may further allow these solicited router advertisements to be multicast from its ports. The solicited router advertisements thus will reach the new client device 510j, as well as other client devices, which may benefit from the updated information. The controller 504 may also cache the solicited router advertisements, for future use.

The example subnet 500 of FIGS. 5A-5B implements caching and forwarding of router advertisements with only one controller 504. In this example, all of the access points 506a-c and client devices 510a-j are "anchored" on the single controller 504. For an access point, being anchored to a controller means that the controller may configure and/or manage various access point functions, such as Service Set Identifiers (SSIDs), radio power, client authentication, client tunnels, security, and/or virtual local area networks (VLANs), among others. A controller that anchors access points may be referred to as an access point anchor controller (AAC). For client devices, being anchored to a controller means that the controller may configure and/or manage the client device. For example the controller may maintain a database of information about client devices currently associated with the access points. The database may include each client device's MAC and IP addresses, security contexts and associations for each client device, quality of service contexts, the access point to which the client device is associated, and other information about the client devices. The controller may further manage authentication, security, encryption, tunnels, group policies, packet forwarding, and/or roaming for client devices, among other things. A controller that anchors client devices may be referred to as a user anchor controller (UAC). A controller may be both an AAC and a UAC. For example, in the subnet 500, the controller 504 is both an AAC and a UAC.

The device to which access points and client devices are anchored may affect caching and forwarding of router advertisements. In the example of FIGS. 5A-5B, all the access points 506a-c and all the client devices 510a-j are anchored on a single controller 504. This single controller 504 may therefore manage any caching and forwarding of router advertisements. Some network configurations include more than one controller. For example, the controller cluster of FIG. 3 may include many controllers. In these configurations, the controllers may coordinate to cache and forward router advertisements. Alternatively or additionally, the controllers may independently cache and forward router advertisements in a coordinated manner.

FIGS. 6A-6E illustrate an example of a subnet 600 with two controllers 604a-b. The subnet 600 also includes several switches 608a-b, several wireless access points 606a-c, and a number of client devices 610a-i. The subnet 600 communicates with networks 622 outside of the subnet 600 through either of two routers 616a-b. The routers 616a-b are connected to the subnet 600 through a first switch 608a. The two controllers 604a-b are also connected to the first switch 608a, downstream from the routers 616a-b. The controllers 604a-b are also connected to a second switch 608b. The access points 606a-c are also connected to the second switch 608b, downstream from the controllers 604a-b. Each client device 610a-i is associated with an access point 606a-c. The access points 606a-c provide wireless network services to the client devices 610a-i.

Figure 6A:
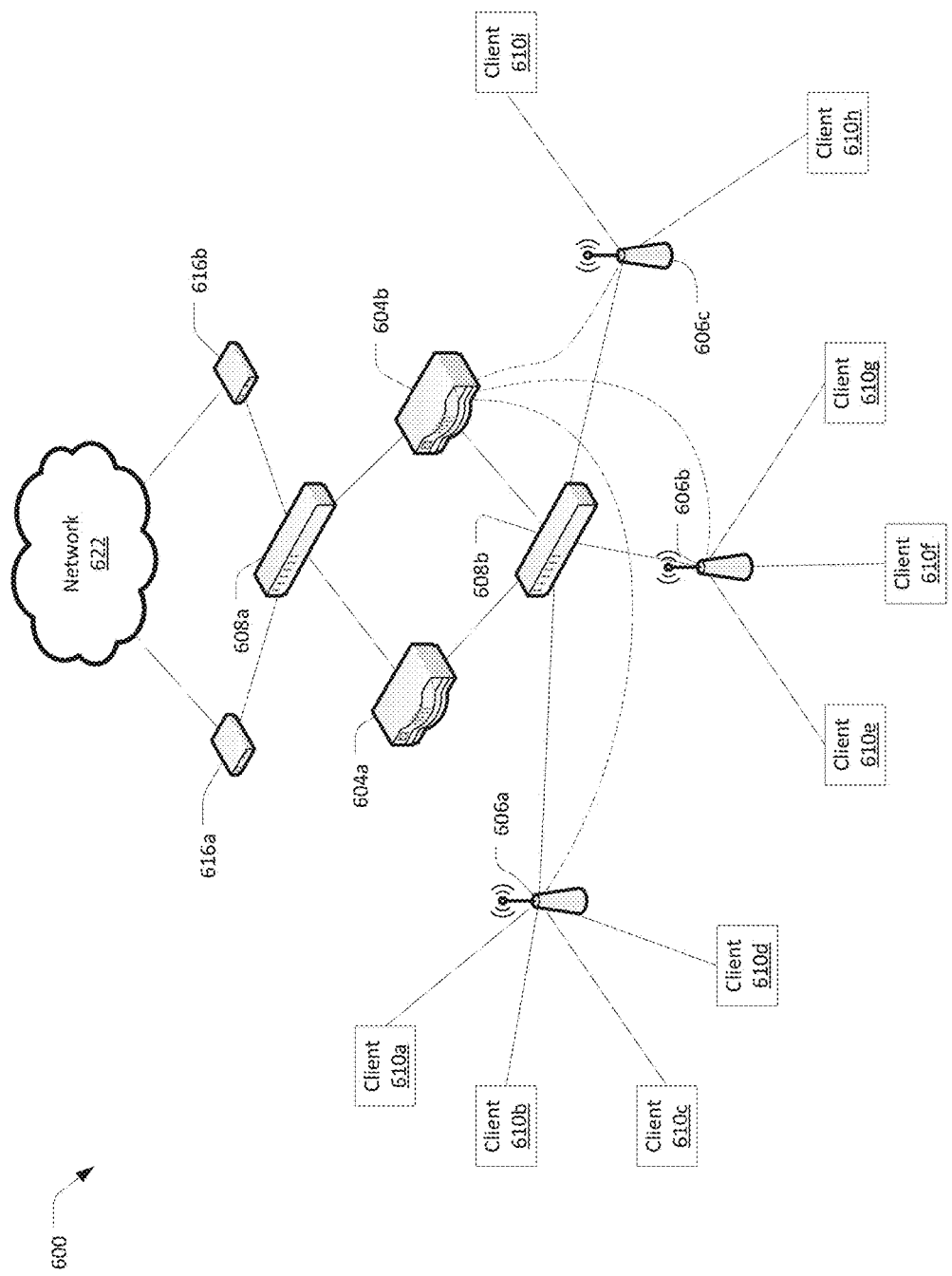
FIG. 6A illustrates an example of a subnet with two controllers, and illustrates that the access points are anchored on a controller.

In the example of FIGS. 6A-6E, the access points 606a-c are anchored on the controller 604b. This is illustrated in FIG. 6A, with dotted lines. The access points 606a-c may be anchored on either controller 604a-b. The access points 606a-c may each be anchored on different controllers. In the present example, the controller 604b may have been configured to provide centralized configuration and/or management of the access points 606a-c. For example, the access points 606a-c may comprise a single wireless LAN, with common SSIDs, authentication, security, etc. It is not always the case, however, that having all access points anchored on the same controller means that the access points are on the same LAN.

Figure 6B:
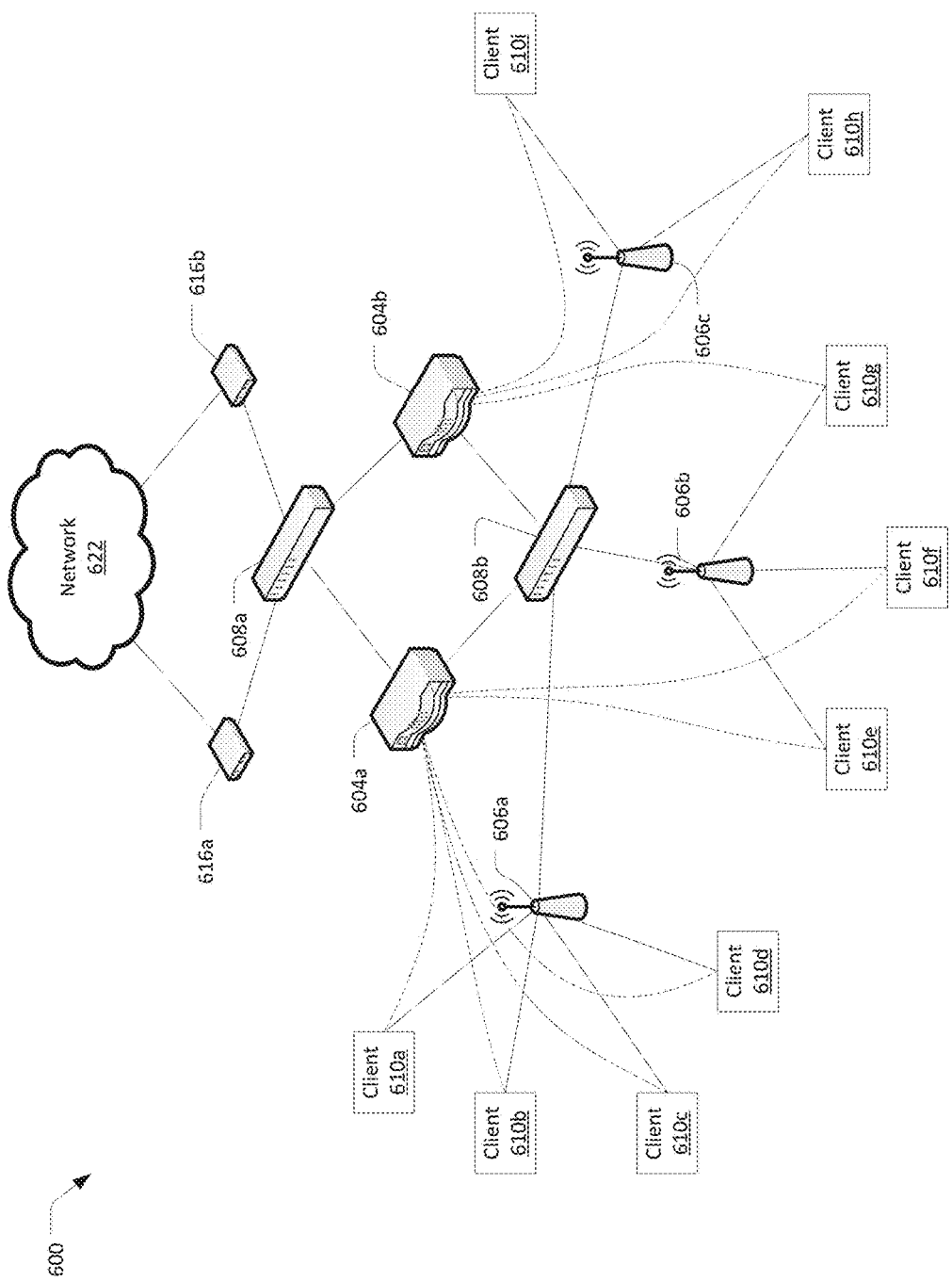
FIG. 6B illustrates an example of where the client devices may be anchored.

FIG. 6B illustrates an example of where the client devices 610a-i may be anchored. The anchor relationship is illustrated with dotted lines. In this example, the client devices 610a-f are anchored on the controller 604a, and the client devices 610g-i are anchored on the controller 604b. In some cases, when a client device associates with an access point, the client device will be anchored on the same controller on which the access point is anchored. In other cases, other factors may determine where a client device anchors. For example, the controllers 604a-b may determine between themselves where a given client device should anchor. In some cases, a client device may have roamed from one access point to another without changing anchor controllers. For example, the client device 610f may have disassociated from one access point 606c and associated with a different access point 606b. Once the client device 610f roamed to the access point 606b, the controllers 604a-b may have determined that the client device 610f will now be anchored on the controller 604a.

Figure 6C:
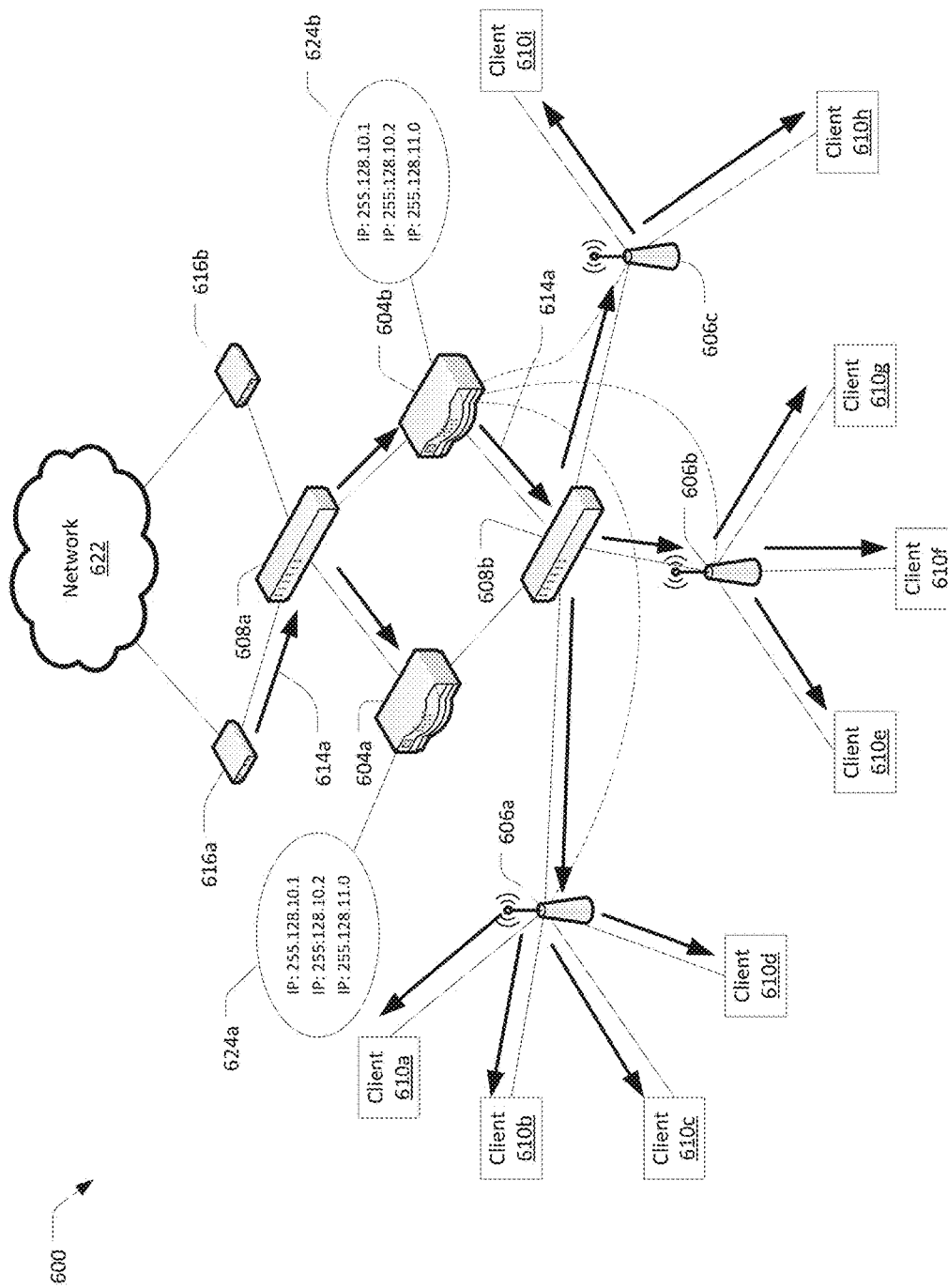
FIG. 6C illustrates an example of the router transmitting a periodic router advertisement to the subnet, and the periodic router advertisement being forwarded to the access points.

Anchor relationships may affect caching and forwarding of router advertisements. FIG. 6C illustrates an example of the router 616a transmitting a periodic router advertisement 614a to the subnet 600. Though not illustrated, the router 616b may also transmit periodic router advertisements, and router advertisements from this router 616b may be treated the same as router advertisements from the router 616a. As noted above, the router 616a may transmit a periodic router advertisement 614a as a multicast packet. The periodic router advertisement 614a is received by the switch 608a, which forwards the periodic router advertisement 614a to all of its ports. Both controllers 604a-b may receive the periodic router advertisement 614a. Each may store a copy 624a-b of at least the most recent periodic router advertisement 614a for possible later use.

As noted above, periodic router advertisements inform the devices in the subnet 600 that the router 616a is available, and may also update the devices in case the router's IP addresses have changed. The periodic router advertisement 614a thus should be able to reach all the devices in the subnet 600. In the illustrated example, the controller 604b has determined that it will forward the periodic router advertisement 614a downstream. To distribute the periodic router advertisement 614a as quickly and broadly as possible, the controller 604b may multicast the periodic router advertisement 614a. The controller 604b, instead of the controller 604a, may have determined that it should forward the periodic router advertisement 614a for a variety of reasons. For example, because the access points 606a-c are anchored on the controller 604b, the controller 604b may have information that may be needed for multicasting to the access points 606a-c. For example, the controller 604b may have the keys to encrypt multicast packets. Upon receiving the periodic router advertisement 614a, the access points 606a-c may forward the periodic router advertisement 614a to all client devices 610a-i that are associated with each access point 606a-c.

The problem presented by many client devices joining a network within a brief span of time is also present in this example. Each new client device may transmit a router solicitation to learn about routers available to the subnet. Each router may respond with multicast solicited router advertisements that are transmitted across the entire subnet. The result may be a very large amount of unnecessary traffic.

Figure 6D:
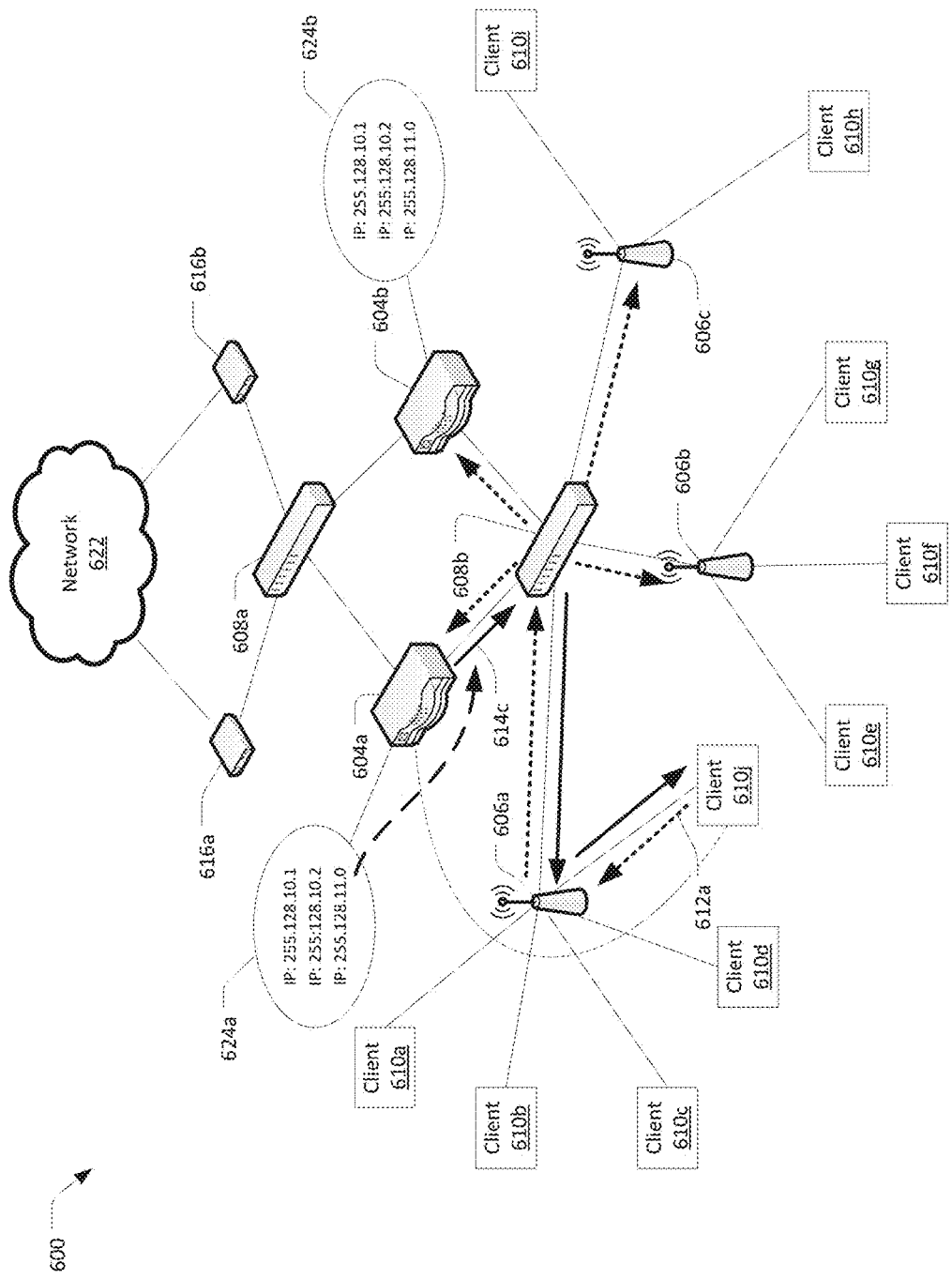
FIG. 6D illustrates an example of a new client device joining the subnet and receiving a cached router advertisement.

FIG. 6D illustrates an example of a new client device 610j joining the subnet 600. The new client device 610j has associated with the access point 606a. Once the new client device 610j associates with the access point 606a, it may be determined that the new client device 610j will anchor on the controller 604a. This determination may be made by the controller 604a, the controller 604b, or both controllers 604a-b working together. Once the new client device 610j has associated with the access point 606a, the new client device 610j may transmit a router solicitation 612a to learn about routers connected to the subnet 600. The router solicitation 612a, which is multicast, may reach both controllers 604a-b. In this example, instead of forwarding the router solicitation 612a so that it may reach the routers 616a-b, the controller 604a responds with one or more cached router advertisements 624a it had cached earlier. The controller 604a may transmit each cached router advertisement 624a as a unicast packet 614c, addressed to the new client device 610j. The new client device 610j thus acquires the router information it requested. Traffic to the subnet as a whole may be minimized, because the cached router advertisement is not broadcast to other devices.

The controllers 604a-b may cooperatively or independently determine that the controller 604a is to respond to the router solicitation 612a. For example, the controller 604a may be the more appropriate controller in this case because it is where the new client device 610j is anchored. The controller 604a may thus have the necessary information, such as unicast encryption keys, to transmit unicast packets to the new client device 610j.

As noted above, in some cases one or both of the controllers 604a-b may forward the router solicitation 612a, even though they each have cached copies of router advertisements. This may occur, for example, when either or both of the controllers 604a-b determine that their cached router advertisements need to be updated. In such cases, the resulting solicited router advertisements may be forwarded in the same manner as periodic router advertisements, as described with respect to FIG. 6C.

Figure 6E:
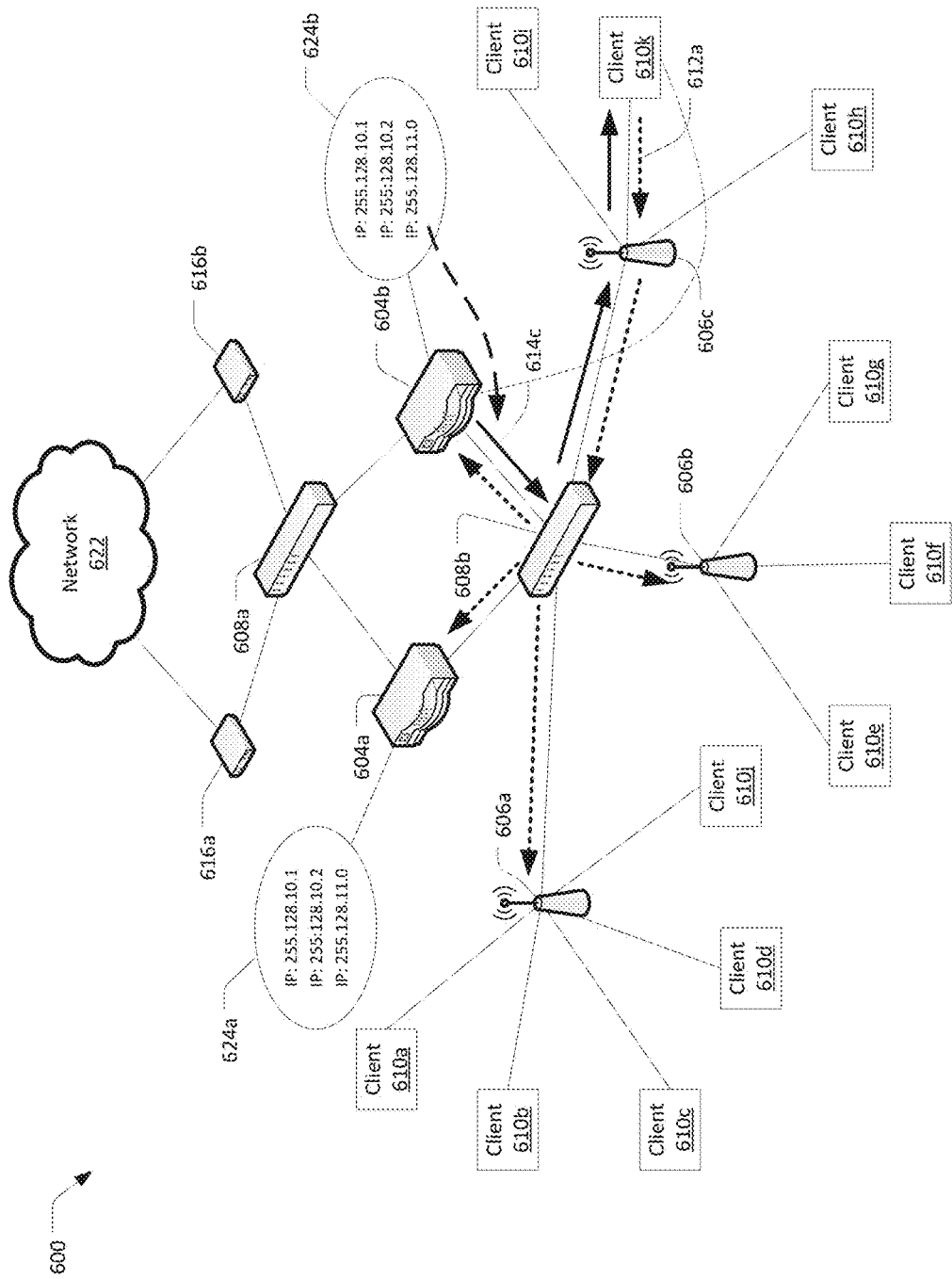
FIG. 6E illustrates another example of a new client device joining the subnet and receiving a cached router advertisement.

FIG. 6E illustrates another example of a new client device 610k joining the subnet 600. The new client device 610k has associated with the access point 606c. Once the new client device 610k has associated with the access point 606c, it may be determined that this client device 610k will anchor on the controller 604b. After association with the access point 606c, the new client device 610k may transmit a router solicitation 612a. In this example, the controller 604b, instead of the controller 604a, may respond to the router solicitation 612a with one or more cached router solicitations 624b. The controller 604b may be the more appropriate controller to respond to the router solicitation 612a for various reasons; for example, because the controller 604b is the anchor controller for the new client device 610k, this controller 604b may have the keys to unicast an encrypted packet to the new client device 610k. The cached router solicitation 624b is transmitted as a unicast packet 614c, addressed to the new client device 610k. The new client device 610k thus receives the router information it requested, and possibly very little network traffic is produced in the process.

FIGS. 6A-6E illustrate that, in a network configuration that includes multiple controllers, the controllers may operate in a coordinated fashion to determine how to cache and forward router advertisements. The controllers may communicate with each other to make these determinations, or may be configured to make these determinations independently. The coordinated efforts of the controllers may reduce the amount of network traffic produced by router advertisements and router solicitations.

IV. Router Advertisements and VLANs

Coordination and cooperation of controllers to manage router advertisements may also be beneficial for network configurations that include virtual local area networks (VLANs). In some implementations, a network configuration may include more than one VLAN. For example, a single access point may be configured with more than one VLAN. In most implementations, routers and router advertisements have no awareness of VLANs. Without the caching and forwarding mechanism described above, in most implementations, router advertisements are transmitted as multicast packets. Multicasting a router advertisement from an access point that is configured with more than one VLAN may be problematic, because the router advertisement may be carrying information that should only go to the devices within one VLAN. Devices in other VLANs that are associated with the same access point may be misconfigured, or direct traffic to an incorrect router, if they receive a router advertisement that was not intended for them.

Figure 7A:
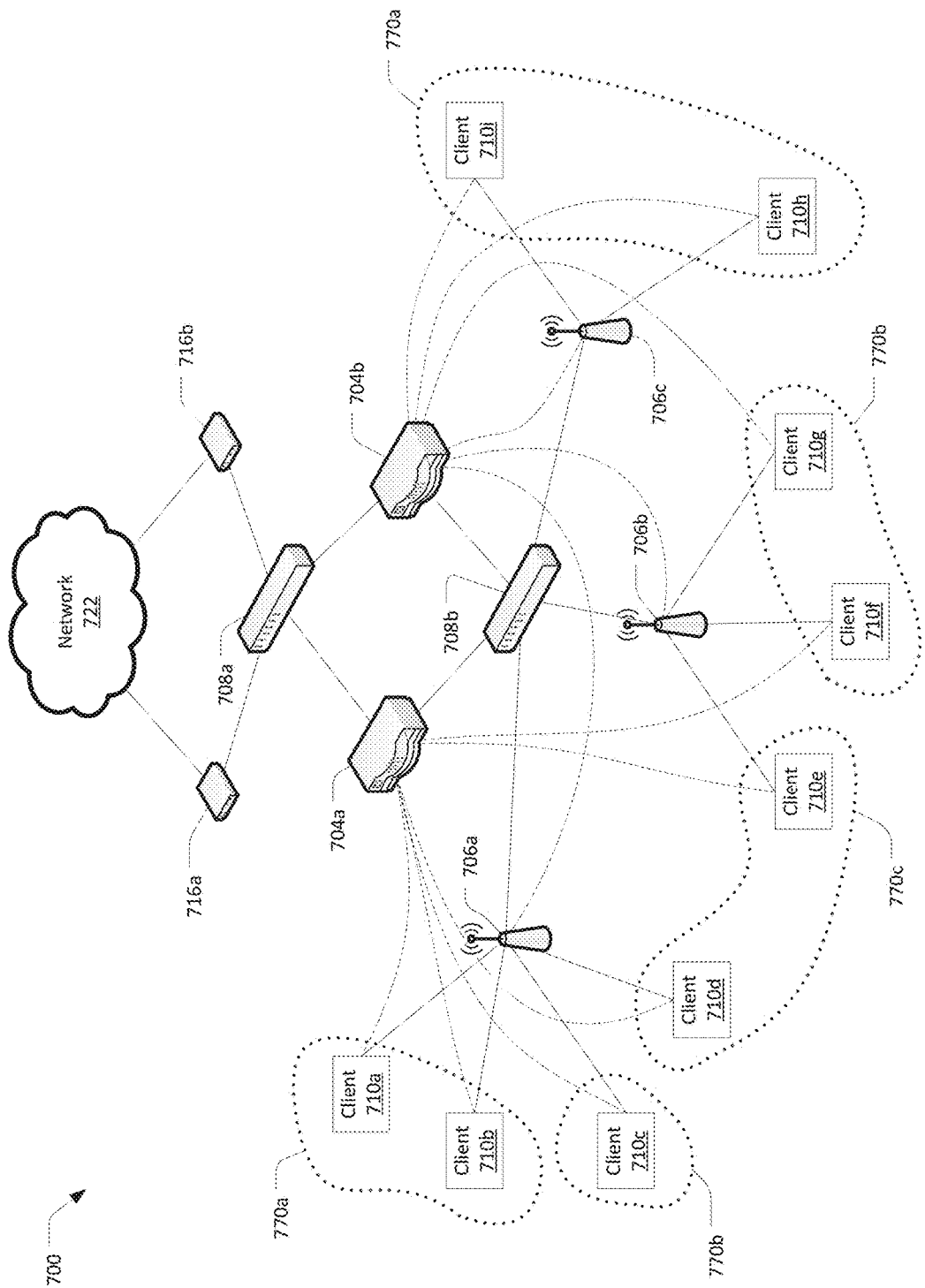
FIG. 7A illustrates an example of a subnet with three VLANs, and an example of the anchor relationships between the devices in the subnet.
Figure 7B:
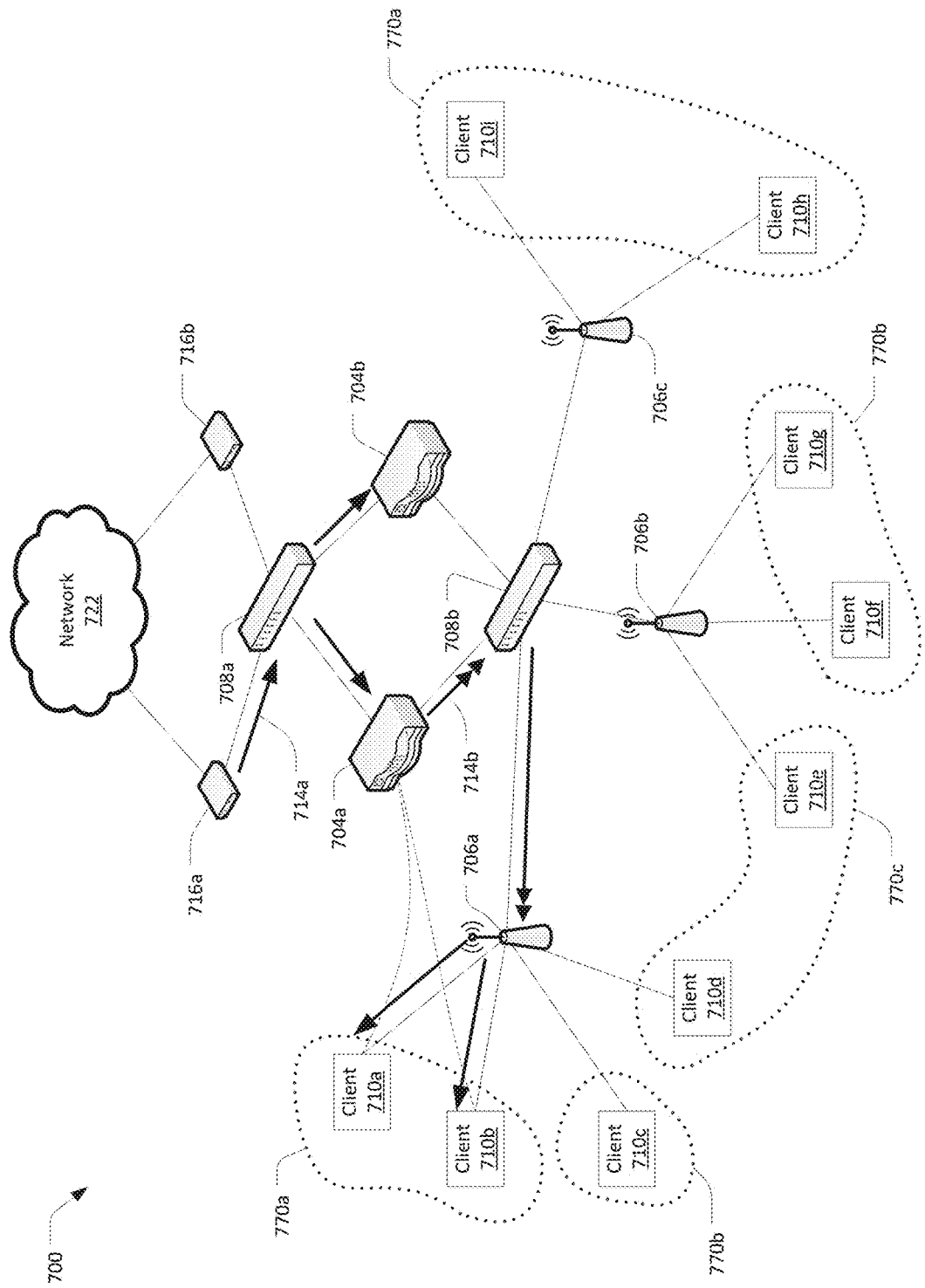
FIG. 7B illustrates one example of a periodic router advertisement being transmitted by one of the routers, and the periodic router advertisement being forwarded to client devices in a VLAN.
Figure 7C:
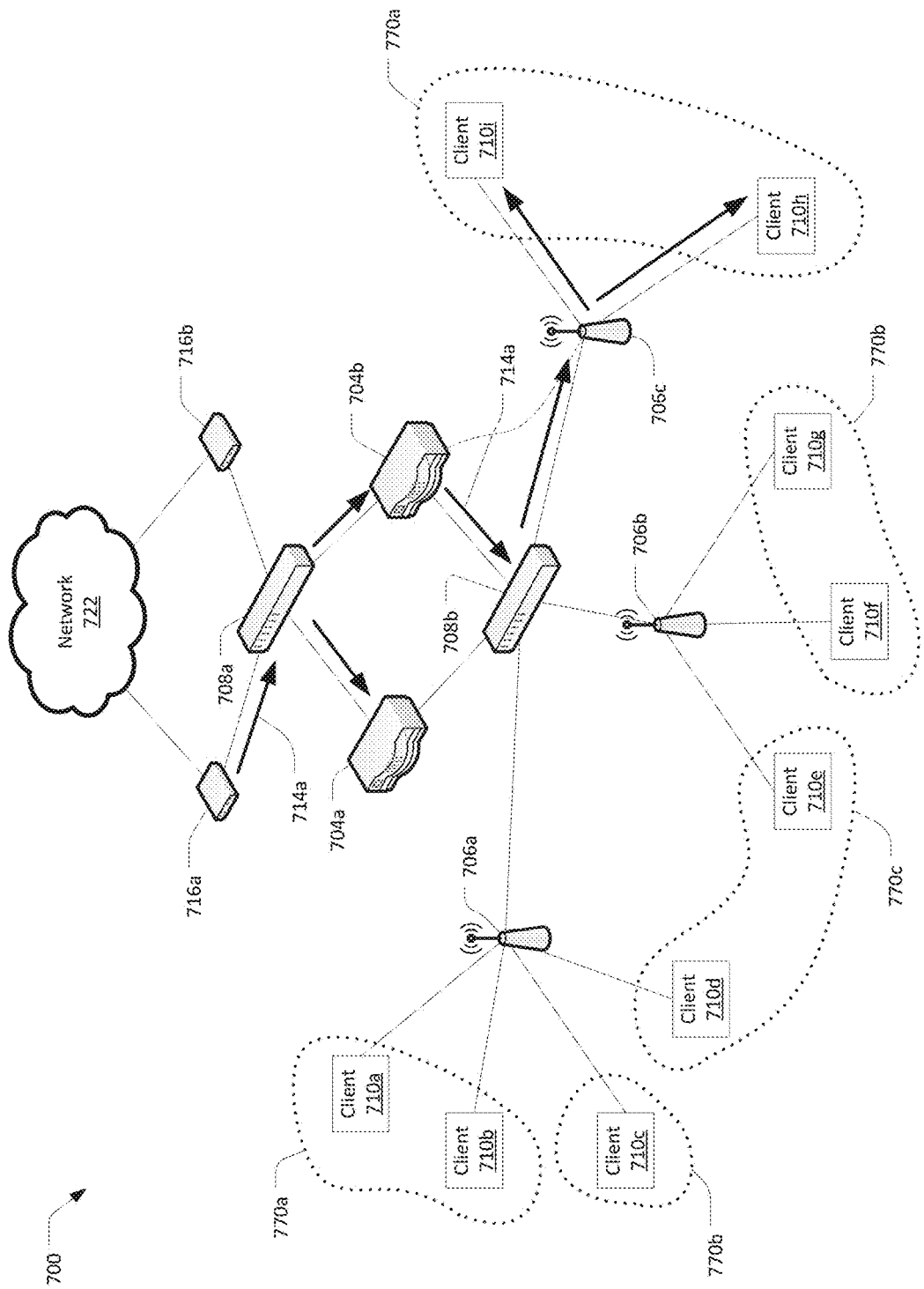
FIG. 7C illustrates the periodic router advertisement being forwarded to other client devices in the VLAN.

FIGS. 7A-7C illustrate one example of a subnet 700 that includes several VLANs 770a-c. In this example, the subnet 700 includes two controllers 704a-b. The subnet 700 also includes several switches 708a-b, several wireless access points 706a-c, and a number of client devices 710a-i. The subnet 700 communicates with networks 722 outside of the subnet 700 through either of two routers 716a-b. The routers 716a-b are connected to the subnet 700 through a first switch 708a. The two controllers 704a-b are also connected to the first switch 708a, downstream from the routers 716a-b. The controllers 704a-b are also connected to a second switch 708b. The access points 706a-c are also connected to the second switch 708b, downstream from the controllers 704a-b. Each client device 710a-i is associated with one of the access points 706a-c. The access points 706a-c provide wireless network services to the client devices 710a-i.

The present example also includes three VLANs. 770a-c. The first VLAN 770a includes the client devices 710a-b, which are associated with the access point 706a. The first VLAN 770a further includes the client devices 710h-i, which are associated with the access point 706c. The second VLAN 770b includes the client devices 710c, 710f, 710g. The client device 710c is associated with the access point 706a, while the client devices 710f-g are associated with the access point 706b. The third VLAN 770a includes the client devices 710d, 710e, which are associated with the access point 706a, 706b, respectively.

A VLAN is a portion of a network that is segmented according to a logical, functional, or organizational grouping. For example, VLANs can be defined for project teams, for the users of a specific group of applications, and/or for departments within a company. As a further example, all workstations and servers used by a particular workgroup team can be connected to the same VLAN, regardless of their physical connections to the network, or the fact that they might be intermingled with other teams. VLANs can also be established or reconfigured without modifying physical connections or network hardware. Devices connected to a VLAN need not be aware that they are connected to a VLAN. For example, the devices in a VLAN may be configured to behave as if they are connected with only switches, and to exchange packets between themselves as if the packets do not need to be routed across intermediate networks. Typically, VLANs are an Open Systems Interconnection (OSI) Layer 2 organization structure, while subnets are a Layer 3 organizational structure.

The example of FIGS. 7A-7C illustrates three VLANs 770a-c, though a network configuration can include any number of VLANs. Although not illustrated here, a VLAN may also include other network equipment, such as bridges, routers, switches, and/or access points.

FIG. 7A also illustrates an example of the anchor relationships between the devices in the subnet 700. The anchor relationships are indicated with dotted lines. In this example, the access points 706a-c are anchored on the controller 704b. This controller 704b may be responsible for configuration and/or management of access point functions. The client devices 710a-f are anchored on the controller 704a. The client devices 710g-710i are anchored on the controller 704b. The controllers 704a-b may manage various functions for their respective client devices 710a-f, 710g-i, such as for example authentication, encryption, tunnels, etc.

Multicasting router advertisements in the subnet 700 may result in client devices in different VLANs receiving the same router advertisement. For example, the access point 706a is configured with three VLANs 770a-c. Should the access point 706a multicast a router advertisement, all the client devices 710a-d will receive the router advertisement, regardless of which VLAN 770a-c to which they belong. This is problematic, because in many implementations, router advertisements contain information that may be specific to a VLAN. For example, some router advertisements carry IP address information, such as a subnet prefix. The client devices in the VLAN 770a may, for example, be required to use the subnet prefix provided by the router 716a and not the subnet prefix of the router 716b. As another example, one VLAN may be defined for employee client devices, and may have higher authentication and security requirements, while another VLAN may be defined for guests, and have lower security requirements but more restricted access rights. A router advertisement that is meant for the employee VLAN that also reaches the guest VLAN may cause a breach of security by providing devices in the guest VLAN access to restricted areas. Conversely, a router advertisement meant for the guest VLAN that also reaches the employee VLAN may cause the devices in the employee VLAN to lose access rights. As yet another example, a VLAN may be configured to have no access to any external networks. A router advertisement sent to this VLAN may provide the devices in the VLAN with a gateway, and thus a route to external networks.

In a network configuration that includes VLANs, router advertisements may need to be forwarded in an intelligent and coordinated fashion, instead of being blindly broadcast across the network. FIG. 7B illustrates one example of a periodic router advertisement 714a being transmitted by one of the routers 716a. The periodic router advertisement 714a is received by the switch 708a, which forwards it to the controllers 704a-b. The controllers 704a-b may determine that the periodic router advertisement 714a should be sent to the VLAN 770a. This determination may be based on, for example, a subnet prefix contained in the router advertisement, the IP address or addresses provided by the router advertisement, the networks that the router 716a is connected to, network security parameters, or some other factor.

The VLAN 770a includes client devices 710a-b, 710h-i. These client devices 710a-b, 710h-i are associated with two different access points 706a, 706c. The example of FIG. 7B addresses the access point 706a. The access point 706a is associated with the client devices 710a-d. The controllers 704a-b may recognize, either separately or in a coordinated fashion, that the access point 706a is configured with three VLANs 770a-c. In some cases, this access point 706a should not receive the multicast periodic router advertisement 714a when the router advertisement 714a is intended only for VLAN 770a. One or both controllers 704a-b thus may determine that a unicast router advertisement 714b should be sent to each of the client devices 710a-b associated with that access point 706a that are on the same VLAN. In some cases, the controller 704a determines that it will itself send the unicast router advertisements 714b. The controller 704a may have the necessary information to cause unicast packets to be transmitted to the client devices 710a-b. For example, the client devices 710a-b are anchored on the controller 704a, and thus the controller 704a may have the keys to encrypt unicast packets for the client devices 710a-b. The controller 704a forwards the periodic router advertisement 714a as unicast packets 714b to the access point 706a. The access point 706a forwards each unicast packet 714b to each of the client devices 710a-b. The unicast packet 714b will not be sent to other client devices 710c-d that are associated with the access point 706a but that are not members of the VLAN.

FIG. 7C continues the example of FIG. 7B, and illustrates transmission of the periodic router advertisement to the remaining client devices in the VLAN 770a. In FIG. 7C, as noted, the access point 706c is associated with client devices 710h-i, which are also members of the target VLAN 770a. The controllers 704a-b may recognize, either separately or in a coordinated manner, that the access point 706c is configured with only one VLAN 770a. With this access point 706c there is no concern that the periodic router advertisement 714a may be sent to client devices that are not in the VLAN 770a. A multicast router advertisement may be more efficient than unicasting to each individual client device. One or both of the controllers 704a-b may thus determine to multicast the periodic router advertisement 714a to the client devices 710h-i. In some cases, the controller 704b determines that it will transmit the multicast router advertisement 714a. The controller 704b may have the necessary information to transmit a multicast packet to the access point 706c. For example, the access point 706c is anchored on the controller 704c, and thus this controller 704b may have the keys to multicast an encrypted packet to the access point 706c. The controller 704b forwards the periodic router advertisement 714a, as a multicast packet, to the access point 706c. The access point 706c then forwards the periodic router advertisement 714a to all its associated client devices 710h-i.

It should be noted that, in some cases, access points may be aware of any VLANS with which they are configured. In such cases, the access points may also have enough information to manage forwarding periodic router advertisements to the correct devices within a specific VLAN. For example, in the example of FIGS. 7B-7C, the controller 704b may multicast the periodic router advertisement 714a to both the access points 706a, 706c. Both the access points 706a, 706c are anchored on the controller 704b, and so the controller 704b may have the necessary information to multicast packets to the access point 706a, 706c. The access point 706c is only configured with VLAN 770a, and thus may multicast the periodic router advertisement 714a to all its associated client devices 710h-i. The access point 706a may recognize that it is configured with three VLANs 770a-c, including the target VLAN 770a. The access point 706a may thus itself determine to unicast the periodic router advertisement 714b to each client device 710a-b on the target VLAN 770a. As in the illustrated example, in this example the periodic router advertisement 714a is sent only the client devices in the VLAN 770a, and not to the client devices that are not members of this VLAN 770a.

FIGS. 7B-7C illustrate examples of managing periodic router advertisements when a network includes more than one VLAN. Controllers in the network determine a target VLAN for the periodic router advertisements. The controllers further determine whether the periodic router advertisements should be unicast to specific client devices in the VLAN. Unicasting the periodic router advertisement may occur when an access point is configured with more than one VLAN. The controllers further determine whether an access point has one only VLAN, in which case the periodic router advertisement can be multicast to the access point. Using these mechanisms, router advertisements are directed to the client devices within a specific VLAN, and any desired separation between VLANs may be maintained.

V. Router Advertisements and Dynamic VLANs

The previous examples illustrate management of periodic router advertisements when a network configuration includes more than one VLAN. The following examples illustrate management of periodic router advertisements when a new client device joins the network. The network may apply derivation rules to determine to which VLAN the new client device should be assigned. As a result of the derivation rules, the VLAN configuration at any access point may change when a new client joins the network.

FIGS. 8A-8D illustrate one example of a subnet 800 that includes several VLANs 870a-c. In this example, the subnet 800 includes two controllers 804a-b. The subnet 800 also includes several switches 808a-b, several wireless access points 806a-c, and a number of client devices 810a-i. The subnet 800 communicates with networks 822 outside of the subnet 800 through either of two routers 816a-b. The routers 816a-b are connected to the subnet 800 through a first switch 808a. The two controllers 804a-b are also connected to the first switch 808a, downstream from the routers 816a-b. The controllers 804a-b are also connected to a second switch 808b. The access points 806a-c are also connected to the second switch 808b, downstream from the controllers 804a-b. Each client device 810a-i is associated with one of the access points 806a-c. The access points 806a-c provide wireless network services to the client devices 810a-i. Though not illustrated, the access points 806a-c are anchored on the controller 804b, the client devices 810a-f are anchored on the controller 804a, and the client devices 810g-i are anchored on the controller 804b.

The present example also includes three VLANs 870a-c. The first VLAN 870a includes the client devices 810a-b, which are associated with the access point 806a. The first VLAN 870a further includes the client devices 810h-i, which are associated with the access point 806c. The second VLAN 870b includes the client devices 810c, 810f, 810g. The client device 810c is associated with the access point 806a, while the client devices 810f-g are associated with the access point 806b. The third VLAN 870a includes the client devices 810d, 810e, which are associated with the access point 806a, 806b, respectively.

Figure 8A:
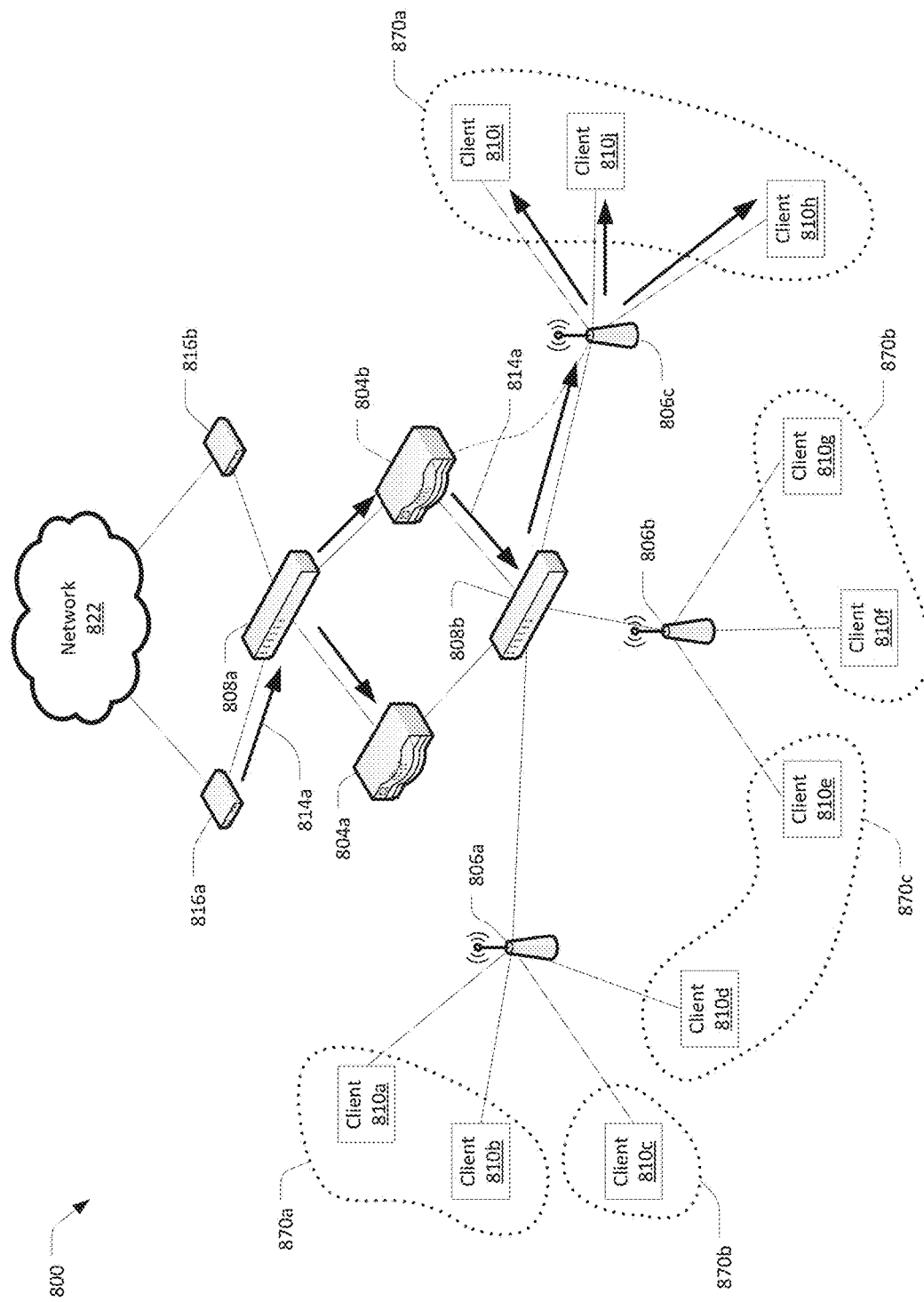
FIG. 8A illustrates an example of a subnet with three VLANs, and also illustrates a new client device joining the subnet.

FIG. 8A also illustrates an example of a new client device 810j joining the subnet 800. In this example, the new client device 810j has associated with the access point 806c. Once the new client device 810j has associated with the access point 806c, derivation rules may be applied to the new client device 810j. The derivation rules may determine that the new client device 810j should be assigned to the VLAN 870a.

In some implementations, derivation rules assign a client device to a VLAN based on various characteristics about the client device. For example, a client device can be assigned to a VLAN based on the SSID it uses, the IP address it is assigned to, and/or information received when the client device is associated or authenticated. Alternatively or additionally, the derivation rules may be based on vendor-specific attributes. For example, a vendor-provided device within the network (such as, for example, an authentication server, a DHCP server, and/or a controller) may authenticate the new client device and return attributes about the client. These attributes may be, for example, an access point group, a security level, a role, a session identifier, etc. A derivation rule may use one or more of these attributes to select a VLAN. Alternatively or additionally, the client device may be assigned to a default VLAN. In some cases, the client device may first be assigned to a default VLAN, and then, after derivation rules are applied, be moved to another VLAN. In some implementations, derivation rules are applied by the access point with which the client device has associated. In other implementations, another network device, such as for example a controller, may apply the derivation rules.

In the example of FIG. 8A, once the derivation rules are applied to the new client device 810j, the client device 810j is assigned to the VLAN 870a. The VLAN configuration for the access point 806c is not changed: prior to the client device 810j joining the network, the access point 806c was configured with only one VLAN 807a. After the client device 810j associated with the access point 806c, the access point 806c continues to be configured with only one VLAN 870a.

In this example, the router 816a may, after the new client device 810j has joined the subnet 800, transmit a periodic router advertisement 814a. The periodic router advertisement 814a is received by the switch 808a, which may forward it to the controllers 804a-b. The controllers 804a-b may, cooperatively or independently, determine that the periodic router advertisement 814a should be sent to the VLAN 870a. The controllers 804a-b may further recognize that the client devices 810h-i and the new client device 810j are members of the VLAN 870a. The controllers 804a-b may further recognize that these three client devices 810h-j are associated with the same access point 806c, and further that this access point 806c is configured with only one VLAN 870a. The controllers 804a-b may thus determine that the periodic router advertisement 814a will be multicast to the client devices 810h j. Because the access point 806c is configured with only one VLAN 870a, even after the new client device 810j joined the network, there is no concern that a multicast router advertisement will be sent to devices on more than one VLAN. In some implementations, the controller 804b determines that it will transmit the multicast router advertisement 814a. The controller 804b may make this determination because it is the anchor controller for the access point 806c, The controller 804b thus may have the necessary information to transmit a multicast packet to the access point 806c. Upon receiving the multicast router advertisement 814a, the access point 806c may forward the multicast periodic router advertisement 814a to all its associated client devices 810h-j.

Though not illustrated here, in the example of FIG. 8A the periodic router advertisement 814a may also be transmitted to the client devices 810a-b, which are also members of the VLAN 870a. The periodic router advertisement 814a may be unicast to these client devices 810a-b, as discussed with respect to FIG. 7B.

Figure 8B:
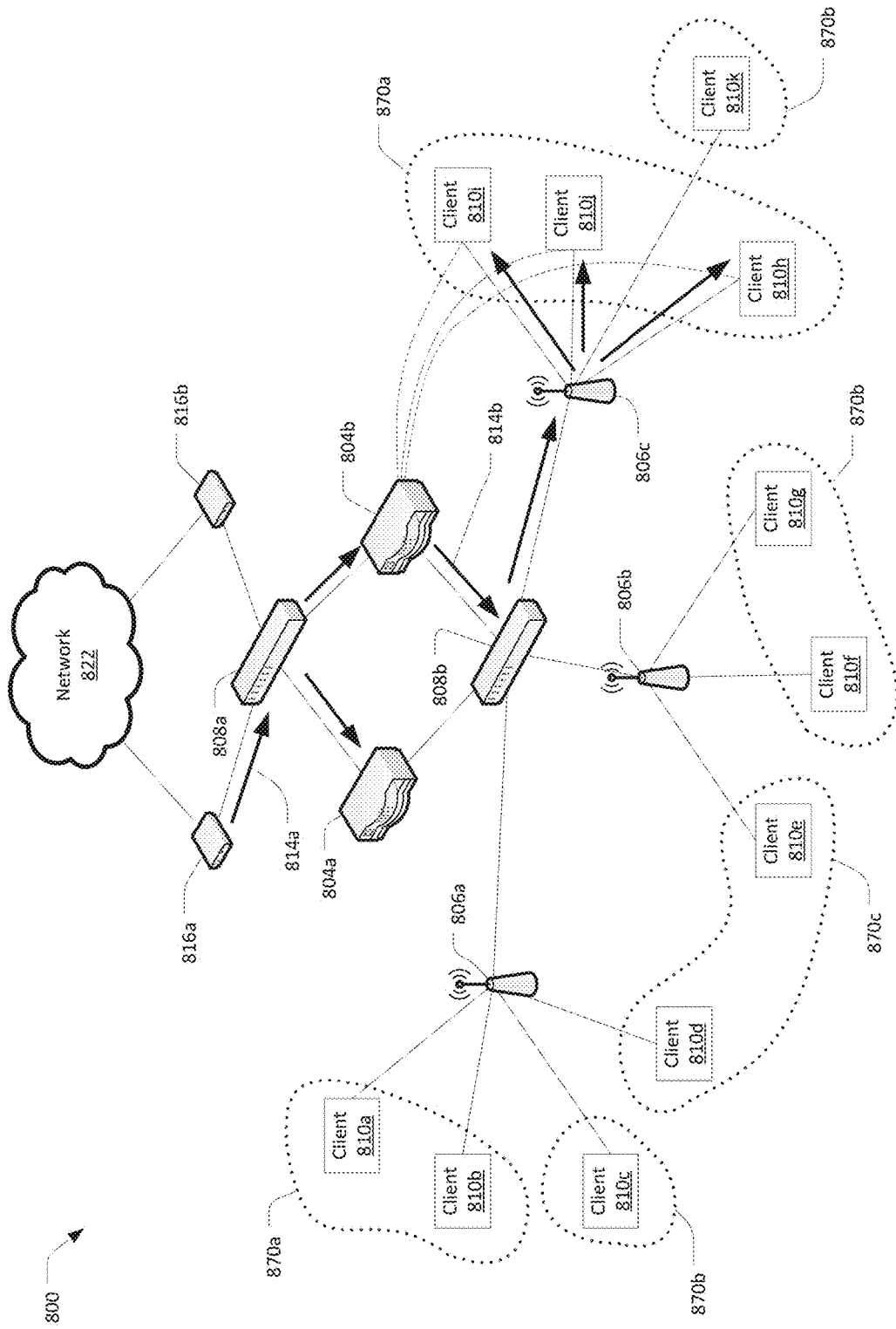
FIG. 8B illustrates another example of a new client device joining the subnet.

FIG. 8B continues the example of FIG. 8A, and illustrates another new client device 810k joining the subnet 800. In this example, the new client device 810k has also associated with the access point 806c. Once the new client device 810k has associated with the access point 806c, a device in the subnet 800, such as for example one of the controllers 804a-b or the access point 806c, may apply derivation rules. The derivation rules may be compared against attributes of the new client device 810k. Application of the derivation rules may determine that the new client device 810k should be assigned to the VLAN 870b. Assigning the new client device 810k may thus result in the access point 806c now being configured with two VLANs 870a-b.

In this example, after the client device 810k has joined the subnet 800, the router 816a may transmit a periodic router advertisement 814a to the subnet 800. As in the example of FIG. 8A, in FIG. 8B, upon receiving the periodic router advertisement 814a, one or both of the controllers 804a-b may determine that the periodic router advertisement 814a is to be sent to the VLAN 870a. With respect to the access point 806c, the controllers 804a-b may recognize that the client devices 810h-j are members of the VLAN 870a. The controllers 804a-b may further recognize that the access point 806c is no longer configured with only one VLAN 870a, but rather is now configured with two VLANs 870a-b. The controllers 804a-b may thus determine that they should no longer multicast router advertisements as they did in the example of FIG. 8A, because in FIG. 8B a multicast router advertisement may now reach client devices 810h-k in different VLANS 870a-b. The controllers 804a-b may thus switch from multicasting router advertisements to access point 806c to unicasting router advertisements to the access point 806c so that the router advertisements are sent only to client devices 810h-i that are members of the VLAN 870a. In some implementations, the controller 804b determines that it may unicast the router advertisement 814b to the client devices 810h-i. The controller 804b may make this determination because it is the anchor controller for the client devices 810h-i. The controller 804b may thus have the necessary information to unicast packets to the client devices 810h-j. By unicasting the router advertisement 814b, the router advertisement 814a intended for the client devices in the VLAN 870a should reach client devices 810h-i that are members of the VLAN 870a, and should not be sent to client devices associated with the access point 806c that are not members of the VLAN 870a.

Though not illustrated here, in the example of FIG. 8B the periodic router advertisement 814a may also be transmitted to the client devices 810a-b, which are also members of the VLAN 870a. The periodic router advertisement 814a may be unicast to these client devices 810a-b, as discussed with respect to FIG. 7B.

Figure 8C:
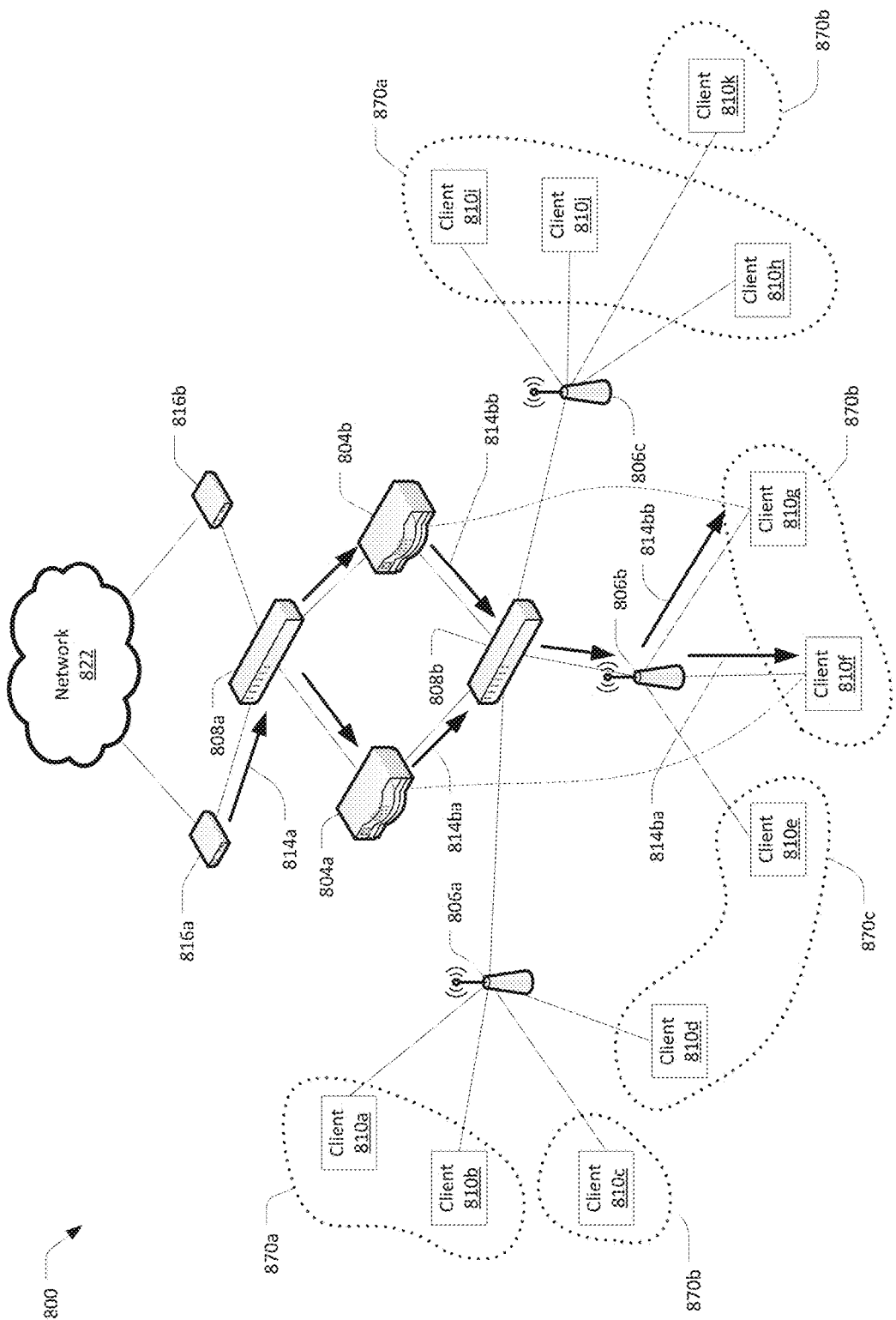
FIG. 8C illustrates another example of a periodic router advertisement being transmitted to the subnet, and being forwarded by different controllers.

FIG. 8C illustrates another example of a periodic router advertisement 814a being transmitted to the subnet 800. In this example, the controllers 804a-b, working cooperatively or independently, recognize that the periodic router advertisement 814a is destined for the VLAN 870b. The controllers 804a-b further recognize that the access point 806b, among others, is associated with client devices 810f-g that are members of the VLAN 870b. In this example, the access point 806b is associated with three client devices 810e-g. The controllers 804a-b may recognize that the client device 810e is a member of the VLAN 870c, and not the target VLAN 870b. The controllers 804a-b may thus recognize that the access point 806b is configured with two VLANS 870b-c. The controllers 840a-b may determine that the periodic router advertisement 814a should be unicast to the client devices 810f-g to avoid the periodic router advertisement 814a from being sent to the client device 810e. In some implementations, the controller 804a may determine that it will cause the unicast the router advertisement 814ba to be sent to the client device 810f, while the controller 804b may determine that it will cause the unicast the router advertisement 814bb to be sent to the client device 810g. The controller 804a may determine that it should cause the unicast router advertisement 814ba to be sent to the client device 810f because the client device 810f is anchored on the controller 804a. The controller 804a may therefore have the information for causing unicast packets to be sent to the client device 810f. Likewise, the controller 804b may determine that it should cause the unicast router advertisement 814bb to be sent to the client device 810g because the client device 810g is anchored on the controller 804b. The unicast router advertisements 814ba, 814bb may be sent to the client devices 810f-g that are members of the VLAN 870b, while not being sent to the client device 810e that is a member of a different VLAN 870c.

Though not illustrated here, in the example of FIG. 8C, the periodic router advertisement 814a may also be transmitted to the client devices 810c, 810k, which are also members of the VLAN 870b.

Figure 8D:
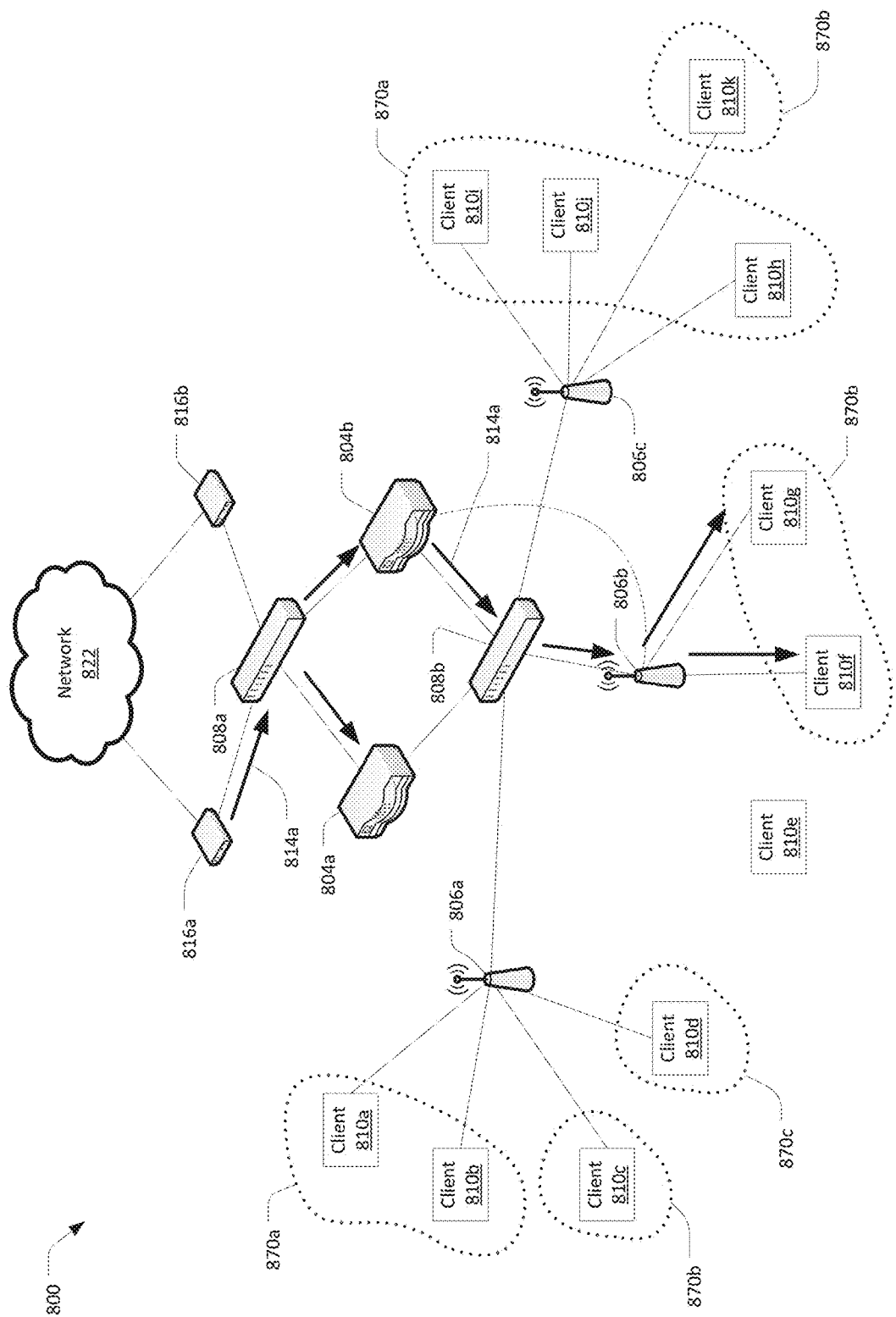
FIG. 8D illustrates an example of a client device leaving the subnet.

FIG. 8D continues the example of FIG. 8C, and illustrates an example of a client device 810e leaving the subnet 800. In this example, the client device 810e has disassociated from the access point 806b, and left the subnet 800. The client device 810e was the only client device associated with access point 806b that was a member of the VLAN 870c. Once the client device 810e has left the subnet 800, the access point 806b is associated with only the client devices 810f-g, both of which are members of the VLAN 870b.

After the client device 810e has left the subnet 800, the router 816a may transmit a periodic router advertisement 814a. One or both of the controllers 804a-b may determine that this periodic router advertisement 814a should be sent to the VLAN 870b. The controllers 804a-b may further recognize that the access point 806b is associated with client devices 810f-g that are members of the VLAN 870b. The controllers 804a-b may also recognize that the access point 806b is no longer configured with two VLANs 870b-c, as was the case in FIG. 8C. In FIG. 8D, the controllers 804a-b may thus recognize that the periodic router advertisement 814a can be multicast to the client devices 810f-g associated with the access point 806c because there is no concern that a multicast router advertisement sent to the access point 806b may be sent by the access point 806b to client devices in other VLANS. In some implementations, the controller 804b determines that it should multicast the router advertisement 814a. The controller 804b may make this determination because it is the anchor controller for the access point 806b, and so may have the information for multicasting to the access point 806b. Upon receiving the multicast router advertisement 814a, the access point 806b may forward the router advertisement 814a to the client devices 810f-g.

Though not illustrated here, in the example of FIG. 8D, the periodic router advertisement 814a may also be transmitted to the client devices 810c, 810k, which are also members of the VLAN 870b.

In the examples illustrated by FIGS. 8A-8D, some implementations may include the caching and forwarding mechanism described earlier. When a client device 810j-k joins the subnet 800, the client device 810j-k may transmit a router solicitation. One or both of the controllers 804a-b may respond with a router advertisement that it had cached earlier.

Caching of router advertisements, and responding to router solicitations with cached router advertisements, may be implemented as described with respect to FIGS. 6A-6E, possibly with the following additional steps. First, as noted above, router advertisements may be directed to a specific VLAN. Controllers may thus cache router advertisements, from each router, for each VLAN. In some cases, this may result in a controller caching multiple router advertisements from the same router. Second, when a controller receives a router solicitation for a new client device, the controller may first identify the VLAN of which the new client device is a member of Having identified the new client device's VLAN, the controller may then select the cached router advertisement that applies to the identified VLAN. The selected router advertisement may then be transmitted as a unicast packet, addressed to the new client device.

FIGS. 8A-8D illustrate examples of managing periodic router advertisements when client devices join a network that includes several VLANs. Derivation rules may be applied to each newly-joined client device. The derivation rules may determine to which VLAN the new client device should be assigned. As new client devices are assigned to VLANs, the VLAN configuration at an access point may change. When an access point is configured with only one VLAN, periodic router advertisements may be multicast to that access point. This is because there is no concern that the multicast router advertisement will be sent to client devices in more than one VLAN. When a client device associates with the access point, the VLAN that this client device is assigned to may cause the access point to now be configured with more than one VLAN. Now, the access point should unicast periodic router advertisements to client devices within a specific VLAN, to avoid the periodic router advertisements from each client device in other VLANS. Should client devices disassociate from the access point and cause the access point to once again be configured with only one VLAN, the access point can start again receiving periodic router advertisements as multicast packets. Using these mechanisms, a network can manager router advertisements and maintain the integrity of any VLANs.

Although the discussion above has specified the controller as the network device which determines whether a router advertisement will be unicast or multicast, in other embodiments, the access point itself may determine whether to unicast or multicast a router advertisement to client devices associated with it.

VI. Network Device

Figure 9:
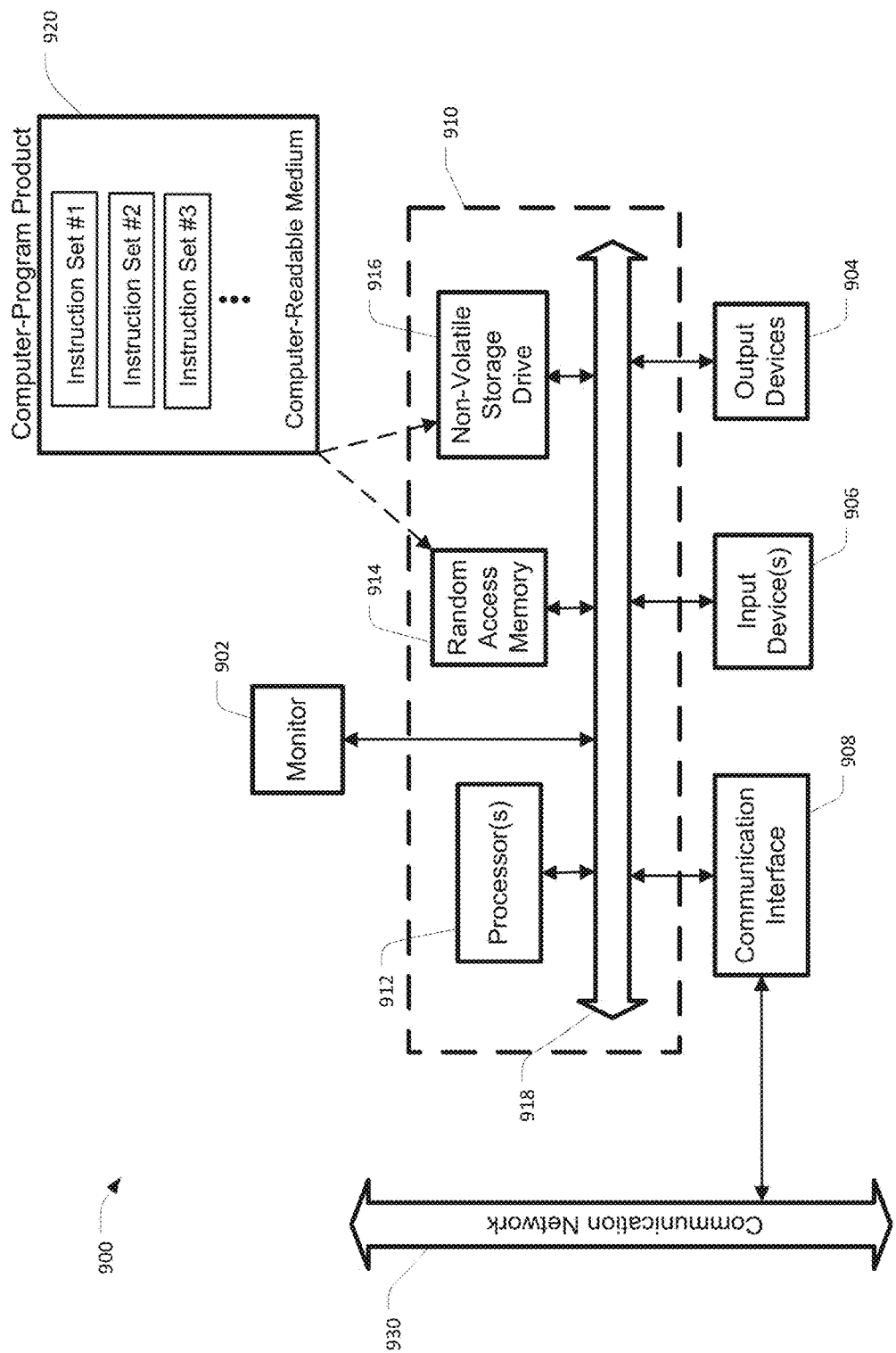
FIG. 9 illustrates an embodiment of a network device.

FIG. 9 illustrates an embodiment of a network device 900. The above methods may be implemented by computer-program products that direct a network device to perform the actions of the above-described methods and components. Each such computer-program product may comprise sets of instructions (code or program code) embodied on a computer-readable medium that directs the processor of a computer system to perform corresponding actions. The instructions may be configured to run in sequential order, or in parallel (such as under different processing threads), or in a combination thereof The network device 900 comprises a processing system 910, an optional monitor 902 coupled to the processing system 910, one or more optional user output devices 904 coupled to the processing system 910, one or more optional user input devices 906 (e.g., keyboard, mouse, track ball, touch screen) coupled to the processing system 910, an optional communications interface 908 coupled to the processing system 910, a computer-program product 920 stored in a tangible computer-readable memory in the processing system 910. The computer-program product 920 directs the network device 900 to perform the above-described methods. The processing system 910 may include one or more processors 912 that communicate with a number of peripheral devices via a bus subsystem 918. These peripheral devices may include the user output device(s) 904, user input device(s) 906, communications interface 908, and a storage subsystem, such as a random access memory (RAM) 914 and/or a non-volatile storage drive 916 (e.g., disk drive, optical drive, solid state drive), which are forms of tangible computer-readable memory.

The computer-program product 920 may be stored in the non-volatile storage drive 916 and/or another computer-readable medium accessible to the processing system 910 and loaded into the memory 914. Each processor 912 may comprise a microprocessor, such as a microprocessor from Intel® or Advanced Micro Devices, Inc.®, or the like. To support the computer-program product 920, the processing system 910 runs an operating system that handles the communications of the computer-program product 920 with the above-noted components, as well as the communications between the above-noted components in support of the computer-program product 920. Exemplary operating systems include ArubaOS from Aruba Networks, Windows® or the like from Microsoft Corporation, Solaris® from Sun Microsystems, LINUX, UNIX, and the like, and/or device- or system-specific operating systems and the like.

The user input devices 906 may include a keyboard, a keypad, a mouse, a scanner, a digital drawing pad, a touch screen incorporated into the display, audio input devices such as voice recognition systems, microphones, and other types of input devices. In various embodiments, the user input devices 906 are typically embodied as a computer mouse, a trackball, a track pad, a joystick, wireless remote, a drawing tablet, or a voice command system. The user input devices 906 typically allow a user to select objects, icons, text and the like that appear on the monitor 902 via a command such as a click of a button or the like. The user output devices 904 include devices and mechanisms to output information from the processing system 910. These may include a display (e.g., a monitor 902), printers, non-visual displays such as audio output devices, etc.

The communications interface 908 provides an interface to communication networks 930 and devices and may serve as an interface to receive data from and transmit data to other systems, WANs and/or the Internet. Embodiments of the communications interface 908 may be an Ethernet card, a modem, a cable modem, a router, a switch, an embedded multimedia adapter (EMTA), a synchronous or asynchronous digital subscriber line (DSL) unit, a FireWire® interface, a USB® interface, a wireless network adapter, and the like. For example, the communications interface 908 may be coupled to a computer network, to a FireWire® bus, or the like. In other embodiments, the communications interface 908 may be physically integrated on a board of the processing system 910, and/or may be a software program, or the like.

The RAM 914 and non-volatile storage drive 916 are examples of tangible computer-readable media configured to store data such as computer-program product embodiments of the systems and methods described herein, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. The RAM 914 and non-volatile storage drive 916 may be configured to store the basic programming and data constructs that provide the functionality of various embodiments of the systems and methods described above.

Software instruction sets that provide the functionality of the described methods may be stored in the RAM 914 and/or non-volatile storage drive 916. These instruction sets or code may be executed by the processor(s) 912. The RAM 914 and/or non-volatile storage drive 916 may also provide a repository to store data and data structures used in accordance with the disclosed systems and methods. The RAM 914 and non-volatile storage drive 916 may include a number of memories including a main random access memory (RAM) to store instructions and data during program execution and a read-only memory (ROM) in which fixed instructions are stored. The RAM 914 and non-volatile storage drive 916 may include a file storage subsystem providing persistent (non-volatile) storage of program and/or data files. The RAM 914 and non-volatile storage drive 916 may also include removable storage systems, such as removable flash memory.

The bus subsystem 918 provides a mechanism to allow the various components and subsystems of the processing system 910 to communicate with each other as intended. Although the bus subsystem 918 is shown schematically as a single bus, alternative embodiments of the bus subsystem 918 may implement multiple busses or communication paths within the processing system 910.

The preceding description provides example embodiments only, and is not intended to limit the scope, applicability, or configuration of the disclosure. Rather, the preceding description of the example embodiments will provide those skilled in the art with an enabling description for implementing an example embodiment. It should be understood that various changes may be made in the function and arrangement of elements without departing from the spirit and scope of the systems and methods as set forth in the appended claims.

Specific details are given in the preceding description to provide a thorough understanding of the embodiments. It will be understood, however, by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive.

It is also noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the various systems and methods are described with reference to specific embodiments thereof, but those skilled in the art will recognize that the disclosed systems and methods are not limited thereto. Various features and aspects of the above-described systems and methods may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
   receiving, at a network device, a plurality of router advertisements from a plurality of routers, wherein the plurality of router advertisements include router service information corresponding to services associated with the plurality of routers on a network;
   storing the plurality of router advertisements;
   receiving a router solicitation from a new client device joining a particular sub-network, wherein the router solicitation includes a request for router service information;
   determining a router from the plurality of routers to be employed by the new client device based upon a selection criterion;
   selecting one of the plurality of stored router advertisements based upon the determining; and
   transmitting the selected one of the plurality of stored router advertisements as a unicast packet to the new client device, wherein at least one other client device in the particular sub-network receives the selected router advertisement as a multicast packet, and wherein the selected router advertisement facilitates a connection to the network when the selected router advertisement is received at the new client device associated with the router solicitation.

2. The method of claim 1, wherein the plurality of router advertisements each correspond to a different router on the network.

3. The method of claim 1, wherein the one stored router advertisement is a periodic router advertisement.

4. The method of claim 1, wherein the one stored router advertisement is a solicited router advertisement.

5. The method of claim 1, further comprising:
forwarding the router solicitation, wherein forwarding includes transmitting the router solicitation on one or more outgoing ports;
receiving an additional router advertisement; and storing the additional router advertisement.

6. The method of claim 1, wherein the one stored router advertisement is the most recent router advertisement associated with the router.

7. The method of claim 6, wherein the most recent router advertisement is a periodic router advertisement.

8. The method of claim 6, wherein the most recent router advertisement is a solicited router advertisement.

9. The method of claim 1, wherein transmitting further comprises:
transmitting the one stored router advertisement to an access point, wherein the access point is anchored at the network device.

10. The method of claim 1, wherein the client device is anchored at the network device.

11. The method of claim 1, wherein the selection criterion comprises which routers are to be employed as default gateways for the new client device.

12. The method of claim 1, wherein the selection criterion comprises which routers have subnet prefixes to be employed by the new client device.

13. A network device, comprising:
one or more processors;
a non-transitory computer-readable medium containing instructions that, when executed by the one or more processors, cause the one or more processors to perform operations including:
receiving a plurality of router advertisements from a plurality of routers, wherein the plurality of router advertisements include router service information corresponding to services associated with the plurality of routers on a network;
storing the plurality of router advertisements;
receiving a router solicitation from a new client device joining a particular subnetwork, wherein the router solicitation includes a request for router service information;
determining a router from the plurality of routers to be employed by the new client device based upon a selection criterion;
selecting one of the plurality of stored router advertisements based upon the determining; and
transmitting the selected one of the plurality of stored router advertisements as a unicast packet to the new client device, wherein at least one other client device in the particular sub-network receives the selected router advertisement as a multicast packet, and wherein the selected router advertisement facilitates a connection to the network when the selected router advertisement is received at the new client device associated with the router solicitation.

14. The network device of claim 13, wherein the plurality of router advertisements each correspond to a different router on the network.

15. The network device of claim 14, further comprising instructions that, when executed by the one or more processors, cause the one or more processors to perform operations including:
selecting one of the plurality of stored router advertisements for transmitting.

16. The network device of claim 13, wherein the one stored router advertisement is a periodic router advertisement.

17. The network device of claim 13, wherein the one stored router advertisement is a solicited router advertisement.

18. The network device of claim 13, further comprising instructions that, when executed by the one or more processors, cause the one or more processors to perform operations including:
forwarding the router solicitation, wherein forwarding includes transmitting the router solicitation on one or more outgoing ports;
receiving an additional router advertisement; and storing the additional router advertisement.

19. The network device of claim 13, wherein the one stored router advertisement is the most recent router advertisement associated with the router.

20. The network device of claim 19, wherein the most recent router advertisement is a periodic router advertisement.

21. The network device of claim 19, wherein the most recent router advertisement is a solicited router advertisement.

22. The network device of claim 13, wherein transmitting further comprises:
transmitting the stored router advertisement to an access point, wherein the access point is anchored at the network device.

23. The network device of claim 13, wherein the client device is anchored at the network device.

24. A computer-program product tangibly embodied in a non-transitory machine-readable storage medium of a network device, including instructions that, when executed by one or more processors, cause the one or more processors to:
receive a plurality of router advertisements from a plurality of routers, wherein the plurality of router advertisements include router service information corresponding to services associated with the plurality of routers on a network;
store the plurality of router advertisements;
receive a router solicitation from a new client device joining a particular sub-network, wherein the router solicitation includes a request for router service information;
determine a router from the plurality of routers to be employed by the new client device based upon a selection criterion;
select one of the plurality of stored router advertisements based upon the determining; and
transmit the selected one of the plurality of stored router advertisements as a unicast packet to the new client device, wherein at least one other client device in the particular sub-network receives the selected router advertisement as a multicast packet, and wherein the selected router advertisement facilitates a connection to the network when the selected router advertisement is received at the new client device associated with the router solicitation.

25. The computer-program product of claim 24, wherein the plurality of router advertisements each correspond to a different router on the network.

26. The computer-program product of claim 25, further comprising instructions that, when executed by the one or more processors, cause the one or more processors to:

select one of the plurality of stored router advertisements for transmitting.

27. The computer-program product of claim 24, wherein the one stored router advertisement is a periodic router advertisement.

28. The computer-program product of claim 24, wherein the one stored router advertisement is a solicited router advertisement.

29. The computer-program product of claim 24, further comprising instructions that, when executed by the one or more processors, cause the one or more processors to;
- forward the router solicitation, wherein forwarding includes transmitting the router solicitation on one or more outgoing ports;
- receive an additional router advertisement; and store the additional router advertisement.

30. The computer-program product of claim 24, wherein the one stored router advertisement is the most recent router advertisement associated with the router.

31. The computer-program product of claim 30, wherein the most recent router advertisement is a periodic router advertisement.

32. The computer-program product of claim 30, wherein the most recent router advertisement is a solicited router advertisement.

33. The computer-program product of claim 24, wherein transmitting further comprises:
- transmitting the stored router advertisement to an access point, wherein the access point is anchored at the network device.

34. The computer-program product of claim 24, wherein the client device is anchored at the network device.

* * * * *